US012794776B2

(12) United States Patent
Hansen

(10) Patent No.: US 12,794,776 B2
(45) **Date of Patent: *Nov. 10, 2026**

(54) SYSTEM, METHOD, AND DEVICE FOR MODIFYING NETWORK FUNCTIONALITY BASED ON PROVIDED PASSPHRASE

(71) Applicant: SoundVision Technologies, LLC, Hurricane, UT (US)

(72) Inventor: Jeffrey Alma Hansen, Draper, UT (US)

(73) Assignee: SoundVision Technologies, LLC, Hurricane, UT (US)

( * ) Notice: Subject to any disclaimer, the term of this patent is extended or adjusted under 35 U.S.C. 154(b) by 69 days.

This patent is subject to a terminal disclaimer.

(21) Appl. No.: 18/778,873

(22) Filed: Jul. 19, 2024

(65) Prior Publication Data

US 2024/0372781 A1 Nov. 7, 2024

Related U.S. Application Data

(63) Continuation of application No. 18/545,817, filed on Dec. 19, 2023, now Pat. No. 12,047,240.

(60) Provisional application No. 63/476,143, filed on Dec. 19, 2022.

(51) Int. Cl.

| | |
|---|---|
| ***H04L 41/0894*** | (2022.01) |
| ***H04W 12/04*** | (2021.01) |
| ***H04W 12/041*** | (2021.01) |
| ***H04W 12/06*** | (2021.01) |
| ***H04W 12/08*** | (2021.01) |

(52) U.S. Cl.

CPC ......... *H04L 41/0894* (2022.05); *H04W 12/04* (2013.01); *H04W 12/041* (2021.01); *H04W 12/06* (2013.01); *H04W 12/08* (2013.01)

(58) Field of Classification Search

CPC H04L 41/0894; H04W 12/04; H04W 12/041; H04W 12/06; H04W 12/08

See application file for complete search history.

(56) References Cited

U.S. PATENT DOCUMENTS

| | | | | |
|---|---|---|---|---|
| 10,096,220 | B2 | 10/2018 | Mookan | |
| 10,999,198 | B2 | 5/2021 | Miu | |
| 11,418,515 | B2 | 8/2022 | Achari | |
| 2005/0198319 | A1 * | 9/2005 | Chan | H04L 63/102 709/228 |

(Continued)

*Primary Examiner* — Chau Le

(74) *Attorney, Agent, or Firm* — Pacer K. Udall; Booth Udall, PLC

(57) ABSTRACT

A mutable network device for a wireless network is disclosed that includes a wired network interface communicatively coupled to a wired network. A processor is communicatively coupled to the wired network interface and configured to: define a first set of network policies and a second set of network policies and associate the first set and the second set of network policies with a first passphrase and a second passphrase, respectively; determine a provided passphrase used by a client device while engaging in an authentication process to secure a network connection between the client device and the wireless network; and configure a traffic kernel module to provide the network connection to the client device, the network connection defined at least in part by the first or second set of network policies if the provided passphrase is the first or second passphrase, respectively.

20 Claims, 10 Drawing Sheets

(56) References Cited

U.S. PATENT DOCUMENTS

| | | | | |
|---|---|---|---|---|
| 2012/0257502 | A1 | 10/2012 | Le Sage | |
| 2013/0122910 | A1* | 5/2013 | Singh | H04W 36/18 455/437 |
| 2018/0061202 | A1* | 3/2018 | Mookan | H04L 67/54 |
| 2020/0382516 | A1* | 12/2020 | Achari | H04L 41/0893 |
| 2021/0014276 | A1* | 1/2021 | Nishijima | H04L 45/24 |
| 2021/0258253 | A1* | 8/2021 | Miu | H04L 45/74 |
| 2022/0417742 | A1* | 12/2022 | Dey | H04W 12/069 |
| 2023/0136319 | A1* | 5/2023 | Logan | H04W 12/06 455/411 |

* cited by examiner

800

SYSTEM, METHOD, AND DEVICE FOR MODIFYING NETWORK FUNCTIONALITY BASED ON PROVIDED PASSPHRASE

RELATED APPLICATIONS

This application is a continuation of U.S. utility patent application Ser. No. 18/545,817, filed Dec. 19, 2023, titled "System, Method, and Device for Modifying Network Functionality Based on Provided Passphrase" which application claims the benefit of U.S. provisional patent application 63/476,143, filed Dec. 19, 2022, titled "System and Method for Modifying Network Functionality Based on Provided Passphrase," the entirety of the disclosure of which is hereby incorporated by this reference.

TECHNICAL FIELD

Aspects of this document relate generally to the management of wireless networks.

BACKGROUND

Between mobile devices becoming a near-universal part of daily life and the development of low-power, inexpensive wireless network interfaces enabling practical Internet of Things (IoT) devices and smart home accessories, wireless networks have never been more ubiquitous.

These networks can be found in almost any context, ranging from stadium networks providing connectivity to thousands of attendees, to the small network provided to customers of a coffee shop, all the way down to a home wireless network dedicated to connecting the various devices used by one family, or even one individual.

One consequence of this is the proliferation of wireless networks. At any given time, a device will typically be "hearing" from multiple networks, each broadcasting a different name (i.e., SSID). Even simple use cases, like a home network, may involve multiple SSIDs (e.g., a personal network, a guest network, different frequency bands used by different technologies, etc.), which can lead to confusion.

Additionally, some desired functionalities have been provided in the smaller-scale use cases, such as a home network, that also introduce additional obstacles. For example, some networks can be configured to only provide internet access within a defined time window, a feature of interest to families with children. However, in conventional networks such functionality is either: enforced for the entire network (an irritation for the adults), dependent upon the creation of an entirely separate network and passphrase, or necessitates the definition of per-device permissions, an additional obstacle to network access that must be dealt with each time a new device is introduced to the home.

Similar issues exist in other use contexts where it is desirable to provide different functionalities to different sets of users or devices. Conventional solutions to these problems are most often confined to expensive enterprise-grade equipment, complicated open source solutions, and/or the expense and complexity of incorporating additional layers of authentication, such as RADIUS. The conventional technologies that address the needs for thousands of users are not practical for the network of a few dozen customers, or a family in their home.

SUMMARY

According to one aspect, a mutable network device for a wireless network includes a wired network interface communicatively coupled to a wired network. A processor and a memory is also included, the processor communicatively coupled to the wired network interface and configured to: define a first set of network policies and associate the first set of network policies with a first passphrase; define a second set of network policies and associate the second set of network policies with a second passphrase, the second passphrase being different from the first passphrase; determine a provided passphrase used by a client device while engaging in an authentication process to secure a network connection between the client device and the wireless network, and further determine if the provided passphrase matches one of the first passphrase and the second passphrase; and configure a traffic kernel module to provide the network connection to the client device, the network connection defined at least in part by the first set of network policies if the provided passphrase is the first passphrase and defined at least in part by the second set of network policies if the provided passphrase is the second passphrase. The first set of network policies and the second set of network policies each include at least one network policy. Each network policy describes a network functionality to be provisioned through the network connection. The first set of network policies differs from the second set of network policies by at least a unique network policy that is found exclusively in one of the first set of network policies and the second set of network policies.

Particular implementations may include one or more or all of the following features.

The memory of the mutable network device includes the traffic kernel module.

The mutable network device further includes a wireless network interface communicatively coupled to the wireless network and the processor. The processor is further configured to: broadcast a Service Set Identifier (SSID) for the wireless network through the wireless network interface; and receive a connection request from the client device through the wireless network interface, the connection request directed to the SSID.

The wireless network is provided solely by a wireless network interface communicatively coupled to the processor of the mutable network device.

The unique network policy includes a schedule and a network functionality that is provisioned according to a schedule.

The network policy enacts a filter to the network connection.

The unique network policy includes a network functionality conditioned upon an action of a user associated with the client device.

The unique network policy comprises a network functionality that is limited.

The unique network policy provisions the network connection subject to a population limit.

The unique network policy defines when the client device will be redirected to a captive portal.

The captive portal includes a user interface through which a schedule exception can be requested.

According to another aspect of the disclosure, a method for modifying functionality within a wireless network based on a provided passphrase includes: defining a first set of network policies associated with a first passphrase for the wireless network; defining a second set of network policies associated with a second passphrase for the wireless network, the second passphrase being different from the first passphrase; determining if the provided passphrase used by a client device while engaging in an authentication process to secure a network connection with the wireless network matches one of the first passphrase and the second passphrase; and configuring a traffic kernel module to provide the network connection to the client device, the network connection defined at least in part by the first set of network policies if the provided passphrase is the first passphrase and defined at least in part by the second set of network policies if the provided passphrase is the second passphrase. The first set of network policies and the second set of network policies each comprise at least one network policy. Each network policy describes a network functionality to be applied to the network connection. The first set of network policies differs from the second set of network policies by at least a unique network policy that is found exclusively in one of the first set of network policies and the second set of network policies.

Particular implementations may include one or more or all of the following features.

The unique network policy includes a schedule and a network functionality that is applied according to a schedule.

The unique network policy enacts a filter to the network connection.

The unique network policy includes a network functionality conditioned upon an action of a user associated with the client device.

The unique network policy includes a network functionality that is limited.

The unique network policy applies a population limit on the network connection.

The unique network policy defines when the client device will be redirected to a captive portal.

The captive portal includes a user interface through which a schedule exception can be requested.

According to another aspect of the disclosure, a method for modifying functionality within a wireless network based on a provided passphrase includes: defining a first set of network policies associated with a first passphrase for the wireless network; defining a second set of network policies associated with a second passphrase for the wireless network, the second passphrase being different from the first passphrase; determining if the provided passphrase used by a client device while engaging in an authentication process to secure a network connection with the wireless network matches one of the first passphrase and the second passphrase; and providing the network connection to the client device, the network connection defined at least in part by the first set of network policies if the provided passphrase is the first passphrase and defined at least in part by the second set of network policies if the provided passphrase is the second passphrase. The first set of network policies and the second set of network policies each comprise at least one network policy. Each network policy describes a network functionality to be applied to the network connection. The first set of network policies differs from the second set of network policies by at least a unique network policy that is found exclusively in one of the first set of network policies and the second set of network policies.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112 (f). Moreover, even if the provisions of 35 U.S.C. § 112 (f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1:
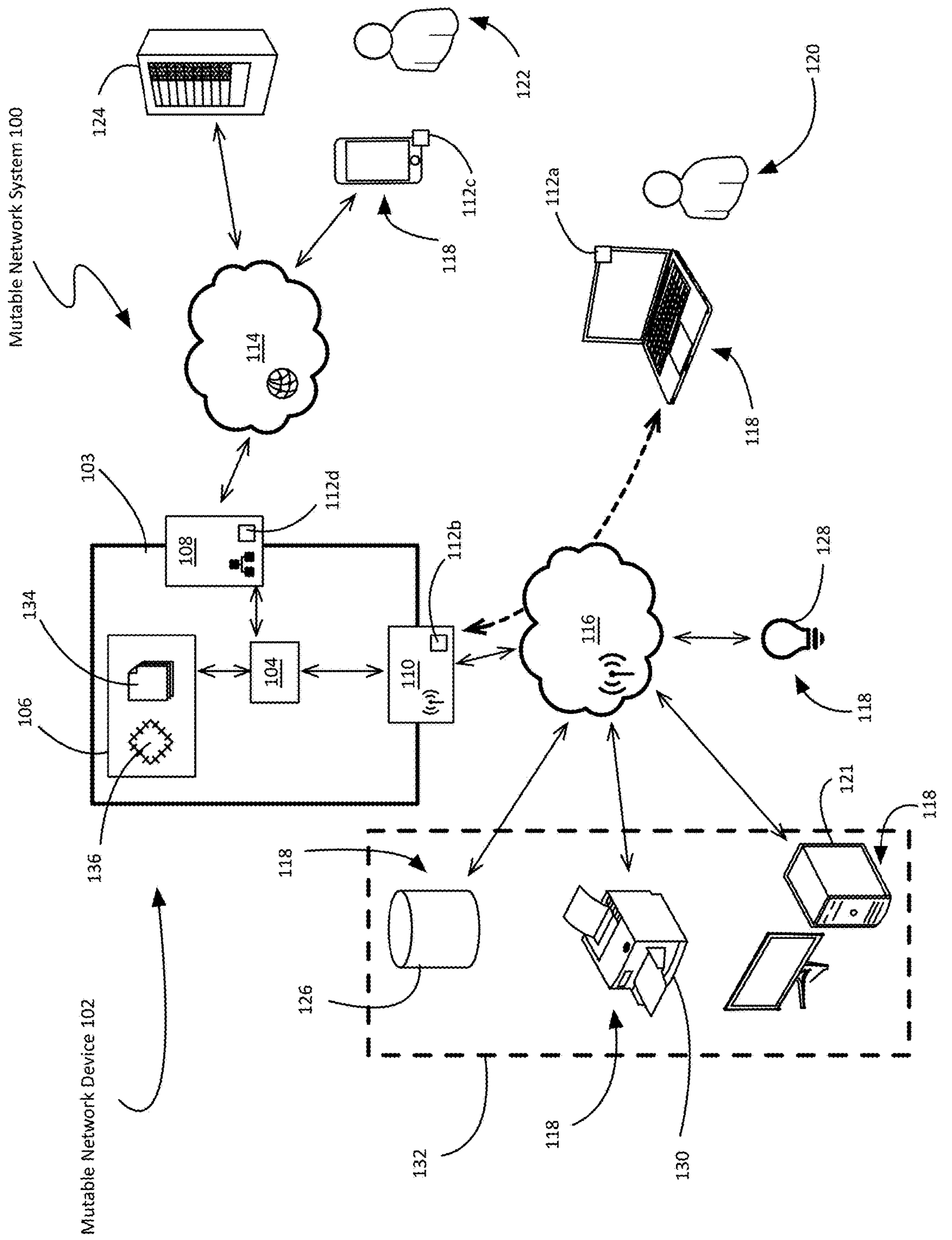
FIG. 1 is a schematic network view of a mutable network system.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Between mobile devices becoming a near-universal part of daily life and the development of low-power, inexpensive wireless network interfaces enabling practical Internet of Things (IoT) devices and smart home accessories, wireless networks have never been more ubiquitous.

These networks can be found in almost any context, ranging from stadium networks providing connectivity to thousands of attendees, to the small network provided to customers of a coffee shop, all the way down to a home wireless network dedicated to connecting the various devices used by one family, or even one individual.

One consequence of this is the proliferation of wireless networks. At any given time, a device will typically be "hearing" from multiple networks, each broadcasting a different name (i.e., Service Set Identifier or SSID). Even simple use cases, like a home network, may involve multiple SSIDs (e.g., a personal network, a guest network, different frequency bands used by different technologies, etc.), which can lead to confusion.

Additionally, some desired functionalities have been provided in the smaller-scale use cases, such as a home network, that also introduce additional obstacles. For example, some networks can be configured to only provide internet access within a defined time window, a feature of interest to families with children. However, in conventional networks such functionality is either: enforced for the entire network (an irritation for the adults), dependent upon the creation of an entirely separate network and passphrase, or necessitates the definition of per-device permissions, an additional obstacle to network access that must be dealt with each time a new device is introduced to the home.

Similar issues exist in other use contexts where it is desirable to provide different functionalities to different sets of users or devices. Conventional solutions to these problems are most often confined to expensive enterprise-grade equipment, complicated open source solutions, and/or the expense and complexity of incorporating additional layers of authentication, such as RADIUS. The conventional technologies that address the needs for thousands of users are not practical for the network of a few dozen customers, or a family in their home.

Contemplated herein is a system, method, and device for modifying the functionality of a wireless network based on the passphrase provided by a client device during authentication. Rather than establishing a separate network with a unique SSID for each set of functionalities needed, or defining network permissions on a device-by-device basis, the wireless network established and managed using the system, method, and device contemplated herein (hereinafter the "mutable network device" or "mutable network system") can provide different sets of functionalities behind a single SSID; which functionalities are provided to a client device depends upon the passphrase it uses to authenticate.

Most wireless networks use a unique passphrase for every individual SSID. The system, device, and method contemplated herein provides specific and sometimes unique functionality tied to each passphrase, and encourages the reuse of individual SSIDs by overloading many functions onto a single SSID, according to various embodiments. Rather than requiring the choice between multiple networks or the tedious definition of per-device permissions, the contemplated system allows different users to have different types of access by simply accessing a single network using a provided passphrase. Any device accessing the provided network with that passphrase will receive that set of functionalities, according to various embodiments.

Furthermore, the system, device, and method contemplated herein may be adapted for various scales, and utilizing various networking hardware, ranging from the enterprise-level environment of a campus-wide network serving an entire college to the consumer-level device(s) providing a wireless network in the home of a single family. This is advantageous over conventional authentication-based systems and methods for managing a wireless network, which have been confined to near featureless consumer solutions or expensive commercial hardware and complex software that is well beyond the means and skill level of the average consumer. The contemplated system, device, and method provides a flexible networking environment able to provide various functionalities that is inexpensive and easy to configure and reconfigure, according to various embodiments.

In the following discussion, the contemplated system, device, and method will be discussed in the context of various exemplary use cases and environments. However, it should be recognized that the systems, devices, and methods contemplated herein may be adapted for use with any wireless networking environment, application, or use case, and is not intended to be limited to the specific examples provided below. Furthermore, while some examples provided will speak of specific protocols, those skilled in the art will recognize that the contemplated systems and methods may be adapted for other networking protocols, including networking protocols yet to be developed.

FIG. 1 is a schematic network view of a non-limiting example of a mutable network system 100. The contemplated mutable network system 100 comprises at least one mutable network device 102 that is configured to modify the functionality of the wireless network 116 for a client device 118 in response to the passphrase used to authenticate and join the client device 118 to that wireless network 116. According to various embodiments, the mutable network system 100 comprises at least one access point 103 that is used to establish a wireless network 116. The mutable network system 100 also comprises at least one mutable network device 102 that modifies the functionality of the wireless network 116 for a client device 118 based on the passphrase used.

In some embodiments, including the non-limiting example shown in FIG. 1, the mutable network device 102 may itself be an access point 103, communicatively coupled to a wired network 114 (e.g., WAN, the Internet, etc.) through a wired network interface 108. In the context of the present description and the claims that follow, an access point 103 is any device that allows wireless devices to connect to a wired network using Wi-Fi or a similar standard. It is important to note that, for the purposes of this disclosure, an access point 103 does not have to have the singular purpose of connecting wireless devices to a wired network 114, but may also fill other roles including, but not limited to, modem (e.g., cable modem, fiber optic modem, etc.), router, switch, firewall, or any other network appliance known in the art.

In other embodiments, the mutable network device 102 may be a separate device that is communicatively coupled to the at least one access point 103 of the system 100, as well as to the wired network 114. In these embodiments, the mutable network device 102 and the at least one access point 103 each comprise a processor and a memory that are configured such that the mutable network device 102 may transmit and/or configure a traffic kernel module 136 and cause it to be loaded into the kernel of each access point 103. Again, in some embodiments, the separate (i.e., not an access point 103) mutable network device 102 may also serve other roles within the network or use environment including, but not limited to, modem (e.g., cable modem, fiber optic modem, etc.), router, switch, NAS, firewall, or any other network appliance known in the art.

In still other embodiments, the contemplated method may be implemented using a conventional, general purpose computer 121, instead of using a network appliance or a single purpose network device. Examples include desktop computers, laptops, servers, and the like. In some of these embodiments, the computer 121 may comprise software configured to instruct access points 103 to load or reconfigure a traffic kernel module 136 to perform the method to be discussed below.

In some embodiments, the mutable network device 102 may be a simple access point 103, with standard hardware common to conventional access point devices. In other embodiments, the mutable network device 102 may also be implemented in specialized hardware that comprises elements providing specific capabilities. For example, in some embodiments, the mutable network device 102 may comprise a chipset providing proprietary features such as hardware VLAN routing and hardware handling for VLAN-specific WIFI GTKs (Group Temporal Key) used to decrypt multicast and broadcast traffic.

According to various embodiments, the wireless network 116 is established by the wireless network interface 110 of the at least one access point 103, whether it/they be mutable network devices 102, or otherwise. In some embodiments of the contemplated system 100, the mutable network device 102 may stand between the wired network 114 and the wireless network 116 (e.g., it is an access point 103, the access point 103 is connected to the wired network 114 through the mutable network device 102, etc.). In other embodiments, the mutable network device 102 may be communicatively coupled to the wired network 114, and is also communicatively coupled to one or more access points 103 through the wired network interface 108 of the mutable network device 102, but it does not stand between the access points 103 and the wired network 114 (e.g., the access point 103 and the mutable network device 102 are connected to the same router or switch, etc.).

While much of the discussion of use cases provided below is in the context of consumer-level or very basic commercial-level environments (e.g., a home, a small shop, etc.), the contemplated system 100, device 102, and method may also be implemented in much larger venues using more sophisticated hardware, including but not limited to stadiums and other public venues. The non-limiting example of a mutable network system 100 shown in FIG. 1 is a very simple system comprising a single access point 103. Other embodiments of the mutable network system 100 may comprise multiple access points 103, and may also include additional network appliances to provide network functionality to a large number of devices over a large physical space, such as a stadium or a campus.

Advantageous over conventional management solutions, the contemplated method may be implemented within a range of hardware form-factors (e.g., different antenna configurations to enable desired RF propagation for a particular application, etc.), rather than being limited to a particular class of hardware, such as expensive enterprise-class hardware that is far outside the budget and needs of smaller entities. Advantageously, the contemplated system, device, and method will provide enterprise-level network management features in a manner that is both inexpensive and simplified enough to be used in consumer-level network appliances such as an access point 103 for a home network.

As shown in FIG. 1, a number of client device 118 are communicatively coupled to the access point 103 (which is also the mutable network device 102 in this non-limiting example) through a wireless network 116. In the context of the present description and the claims that follow, a client device 118 is any device that would need to provide a passphrase to connect to the wireless network 116. Examples include general purpose computers 121 (e.g., mobile devices, desktop computers, laptops, etc.), storage devices 126 (e.g., network accessible storage or NAS, file server, etc.), Internet of Things (IoT) devices 128 (e.g., smart home devices, sensors, wearables, etc.), printers 130, scanners, media servers, and the like.

Some client devices 118 may serve as an interface for a user 120, such as a laptop. Other client devices 118 may serve as a resource that is accessible through the wireless network 116 (e.g., printer 130, storage device 126, etc.) and may be utilized through the wireless network 116 using an authenticated client device 118. As shown, client devices 118 within the wireless network 116 may belong to a VLAN 132, in some embodiments. Functionalities made available through the wireless network 116 such as access and use of resources, VLANs, and the like, are able to be managed by the mutable network device 102 based on the passphrase a client device 118 uses to authenticate with the wireless network 116. Specific examples of this management using network policies 134 will be discussed below.

As shown in FIG. 1, a client device 118 may be used by a specific user 120. For the most part, the contemplated system, method, and device is less concerned with the identity of the user 120 operating a client device 118, and is instead focused on the passphrase used to authenticate the client device 118 to the wireless network 116. According to various embodiments, a passphrase may be used by more than one client device 118 at the same time within the contemplated system 100. In other words, two different users 120 could be using the same passphrase with two different client devices 118 on the same wireless network 116 simultaneously. However, there are instances when the identity and/or actions of the user 120 is taken into account, as will be discussed below in the context of FIG. 2.

The mutable network device 102 is able to be configured by an administrator 122. In some embodiments, the administrator 122 may connect to the mutable network device 102 using a client device 118 connected to the wireless network 116. In other embodiments, the administrator 122 may interact with the mutable network device 102 through a connection with the wired network 114, or even remotely over the Internet.

As shown, in some embodiments, the mutable network device 102 comprises a processor 104 and a memory 106, with the processor 104 communicatively coupled to a wired network interface 108 (i.e., a network interface controller or NIC for a wired network). The wired network interface 108 is communicatively coupled to a wired network 114. In some embodiments, including the non-limiting example shown in FIG. 1 where the mutable network device 102 is also an access point 103, the processor 104 of the mutable network device 102 may also be communicatively coupled to a wireless network interface 110 (i.e. a NIC for a wireless network) that is in turn communicatively coupled to a wireless network 116. These network interfaces, and all of the client devices 118, have a unique identifier 112 (e.g., MAC address, BSSID, etc.) that is specific to that particular device or interface, as is known in the art.

In some embodiments, and in many conventional devices, the BSSID (i.e., Basic Service Set Identifier) may be based upon, or otherwise related to, a value established at the time of manufacture, such as the hardware MAC address for the wireless network interface 110. In other embodiments, the BSSID may be a unique identifier by which a network/band/radio may be specifically known and distinguished from other such entities, but may be generated or modified after the device was manufactured. Such an arrangement gives the contemplated device greater flexibility when it comes to the creation and deletion of SSIDs during operation. Those skilled in the art will recognize that while the origin of the identifier may vary from device to device, or from protocol to protocol, the concept of a unique identifier for a network interface plays a part in authentication and messaging.

The memory 106 of the mutable network device 102 comprises a collection of network policies 134 and a traffic kernel module 136, according to various embodiments. In the context of the present description and the claims that follow, a network policy 134 defines one or more network functionalities that may be provided to a client device 118. In some embodiments, a network policy 134 may also comprise a limitation that governs the context in which the defined functionality or functionalities is made available. According to various embodiments, the contemplated mutable network device 102 is configured to apply, or cause an access point 103 to apply, a network policy 134 to the connection of a client device 118 to a wireless network 116 that is selected based upon the passphrase used to authenticate the client device 118 when connecting to the wireless network 116. Network policies 134 and network functionalities will be discussed in greater detail with respect to FIG. 2, below.

In the context of the present description and the claims that follow, a traffic kernel module 136 is a piece of code that can be loaded and unloaded into the kernel of the access point 103 upon demand. Kernel modules extend the functionality of the kernel without the need to reboot the system. More specifically, the traffic kernel module 136 extends the functionality of the kernel of the access point 103 such that network activity coming from a particular device (identified when authenticated to the network using a particular passphrase) can be treated in such a way that one or more network policies 134 associated with that passphrase can be applied or enforced on said network activity. The traffic kernel module 136 also facilitates the association of an identifier (e.g., assigned IP address, unique identifiers 112, etc.) of a device with the passphrase used to authenticate, such that the proper network policy 134 or policies 134 can be identified and the traffic kernel module 136 can be configured. In some embodiments, this may be adapted for use with the embedded operating system of conventional access points 103. In other embodiments, the traffic kernel module 136 may be utilized within a proprietary operating system, which may run on standard or non-standard access point hardware.

According to some embodiments, the network connection provided to a client device 118 and defined, at least in part, by the network policy 134 or policies 134 that are associated with the provided passphrase may be provisioned and policies enforced by a traffic kernel module 136. In other embodiments, the connection may be defined and the policies 134 enforced by something other than a kernel module 136. Examples include, but are not limited to, conventional traffic/filtering rules and tables, code running on the access point 103 that extends the network stack, a modified wireless driver, and the like. Furthermore, in some embodiments the traffic kernel module 136 may be entirely proprietary, while in other embodiments, at least a portion of the traffic kernel module may be implemented using conventional frameworks such as Netfilter.

The network policies 134 and functionalities are defined by an administrator 122 and associated with particular passphrases using a user interface, according to various embodiments. The administrator user interface will be discussed further in the context of FIG. 5, below. These policies and other configurations are stored in the memory 106 of the mutable network device 102, as shown. The mutable network device 102 can then distribute to the access points 103 within the mutable network system 100 the required information, such as the traffic kernel module 136. In some embodiments, including the non-limiting example shown in FIG. 1, the mutable network device 102 may also be an access point 103, and the only access point 103 in the mutable network system 100. In other embodiments, the mutable network system 100 may comprise multiple access points 103 which may or may not also be mutable network devices 102. In some embodiments, the traffic kernel module 136 and other information such as network policies 134 may be distributed locally to the access points 103 or other mutable network devices 102 (e.g., when one serves as the administrator interface and has receive new configurations, etc.).

In other embodiments, these configurations may be defined and/or stored remotely, such as in cloud storage or some other system that will be referred to hereinafter as a server 124, which is communicatively coupled to the wired network 114, through which the one or more mutable network device 102 may be accessed to upload the configuration information.

As a specific example, in some embodiments a HTTPS POST command may be sent to a cloud back-end server 124. The cloud back-end determines which access points 103 are impacted by, for example, a SSID configuration change, and creates a new configuration payload for each impacted access point 103. The cloud back-end then sends this new configuration to all impacted access points 103 via an MQTT channel. If the access points 103 are currently connected to the MQTT channel, they will receive, store in flash, and apply the new configuration immediately. If they are not connected, they will upload the hash of their most recent configuration to the cloud as they connect the next time. If that hash does not match the hash stored in the back-end database, the back-end will send the access point 103 the updated configuration at that point.

Conventional enterprise access points tend to be heavily reliant on a controller device; if the controller goes offline, some core functionalities such as authentication, scheduling, filtering, hotspot provisioning, etc. can become unavailable. Advantageous over conventional enterprise systems, the mutable network system 100 contemplated herein comprises one or more mutable network devices 102 that are able to receive instructions (e.g., instructions provided to a configuration agent running on the device 102, etc.) through an interface provided by the device 102 (e.g., a web interface for configuring policies 134, etc.) or received from a cloud platform. Once received, the mutable network devices 102 are able to provide all network functionality autonomously, without reliance on a controller or other device to execute the instructions.

As a specific example, in one embodiment the mutable network devices 102 may maintain a constant connection to a cloud platform (e.g., server 124). Upon receipt of any changes to the policies at the cloud server, all mutable network devices 102 are updated immediately, in real-time or near real-time, from the cloud platform. In another embodiment, the remote server 124 providing a cloud platform that provides the instructions may be replaced by a device that is local to the mutable network devices 102; however, this hardware controller, though installed on-site like a conventional controller, simply gives the mutable network devices 102 the latest set of instructions, which they will continue to implement even if the controller device goes offline. This is one way the contemplated system, device, and method offer specific improvements to networking technology, in addition to providing enterprise-level features in simple to use consumer level devices.

Figure 2:
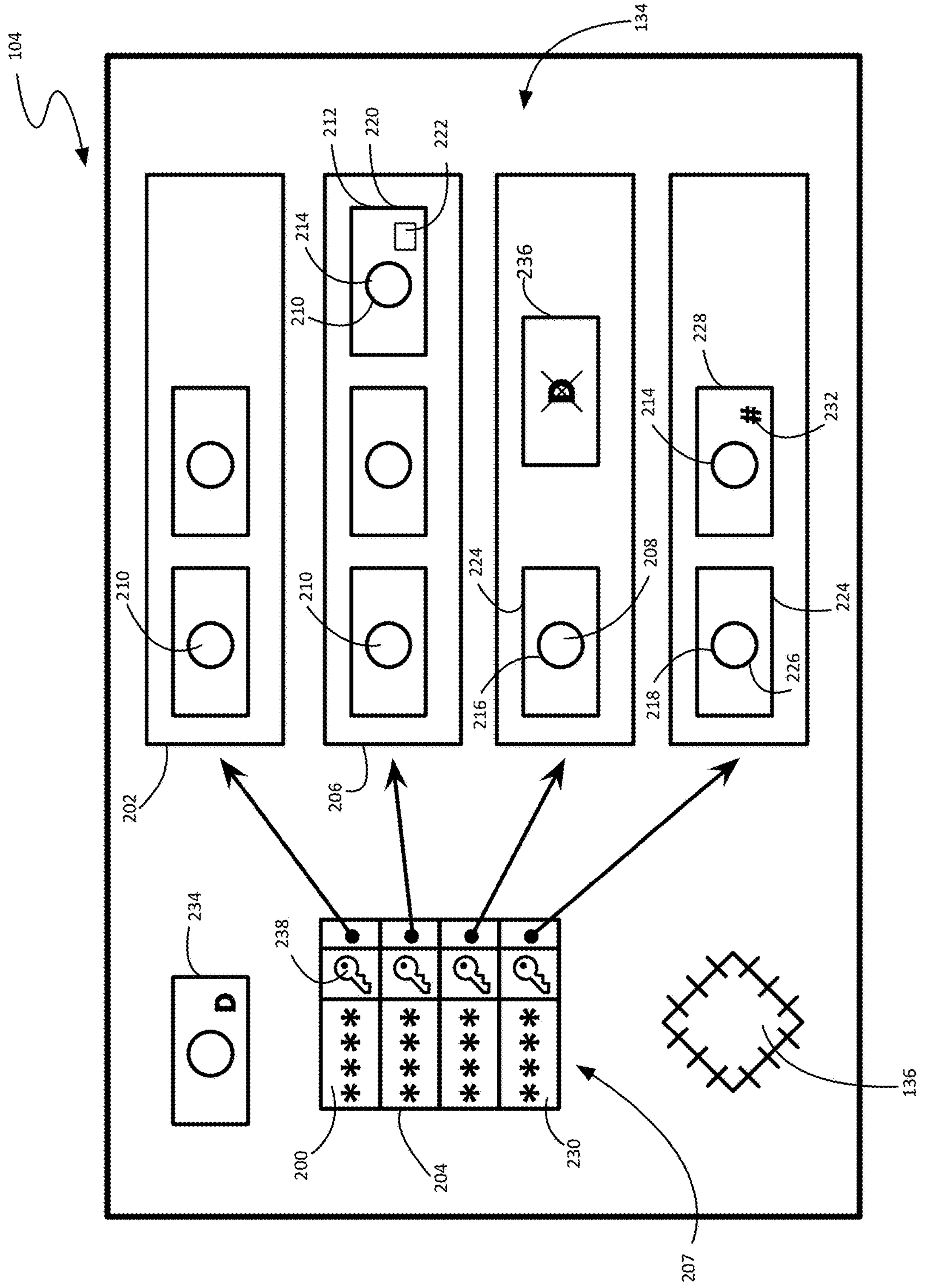
FIG. 2 is a schematic view of the memory of a mutable network device.

FIG. 2 is a schematic view of a non-limiting example of the memory of the mutable network device 102 of FIG. 1. Specifically, FIG. 2 shows schematic representations of non-limiting examples of a plurality of passphrases (e.g., first passphrase 200, second passphrase 204, etc.) and network policies 134 (e.g., first set of network policies 202, second set of network policies 206, etc.), in addition to a traffic kernel module 136.

It should be noted that while the following discussion is done in the context of a first passphrase 200 and a second passphrase 204 and associated sets of network policies 134, this is done for illustrative purposes. In other embodiments, the contemplated mutable network device 102 can manage and modify the functionality of a wireless network 116 based upon numerous unique passphrases. The discussion of first and second passphrases should not be interpreted as limiting the contemplated system 100, method, and device 102 to only two different passphrases.

As previously mentioned, a network policy 134 specifies one or more network functionalities 210 that may be provided to a client device 118. In some cases, a network policy 134 may also comprise a limitation that governs the context in which the defined functionality 210 or functionalities 210 is made available. Some network policies 134 may comprise a single network functionality 210, while others may specify multiple network functionalities 210, which may be beneficial in the case of a collection of network functionalities 210 that are typical to many of the passphrases being configured for the system 100. Those commonly shared (but not universal, as will be discussed below) could be specified within a single network policy 134 to speed up the definition of new passphrases with this shared functionality.

Some network policies 134 may also comprise a condition, according to various embodiments. Evaluation of the condition or conditional statement is used to determine how and/or when the accompanying network functionality 210 will be applied or made available. In some embodiments, the conditions may be simple two state binary considerations, a yes/no question that determines whether or not to provide the accompanying functionality. In other embodiments, the condition may be more complex. For example, in one embodiment, the condition may be multi-state, with functionality specified for each state. In another embodiment, the condition may be an evaluation whose result lies within a range (e.g., what time is it, how many people are using the wireless network, etc.). In some embodiments, a network policy 134 may have a condition whose determination may be performed using information that exists within the mutable network system 100. In other embodiments, the condition may require information outside of the mutable network system 100 (e.g., whether the user 120 has commented on social media, etc.).

FIG. 2 shows a schematic view of various network policies 134. In practice, a network policy 134 may exist as a file, or part of a file, within the memory 106 of the mutable network device 102, according to some embodiments. In other embodiments, the network policies 134 may be stored as objects or records in a database. In still other embodiments, the network policies 134 may be stored in any other form known in the art that makes them accessible to the mutable network device 102.

As previously discussed, each network policy 134 describes at least one network functionality 210 and governs the circumstances in which it/they are applied to the network connection 306. In the context of the present description and the claims that follow, a network functionality 210 refers to a set of one or more aspects, characteristics, connectivities, capacities, privileges, resources, permissions, or other attribute(s) that can describe a wireless network, an interaction with a wireless network, and/or an interaction within a wireless network.

According to various embodiments, network functionalities 210 may be categorized as being at least one of a network access 214, a network capacity 216, and/or a network resource 218. Those skilled in the art will recognize that there may be network functionalities that could be described using more than one of an access 214, a capacity 216, and a resource 218.

In the context of the present description and the claims that follow, a network access 214 is the ability, or lack thereof, to communicate with and/or receive communications from a device or a network. Examples of a network access 214 include, but are not limited to, being able to access external networks and/or the Internet, able to access internal networks, able to interact with IoT devices, a filter or lack thereof, able to access other devices, able to communicate using a particular port, exposed to specific VLAN interfaces, and the like.

In the context of the present description and the claims that follow, a network capacity 216 describes the degree to which a network access 214 may be utilized, or the nature of the network access itself. Examples of a network capacity 216 include, but are not limited to, adapted for a large number of devices, adapted for a small number of devices, bandwidth 208, latency, jitter, optimized for speed, optimized for latency, and the like.

In the context of the present description and the claims that follow, a network resource 218 describes what falls within the boundaries of a network access 214 and how it may be utilized, either in sending or receiving. Examples of a network resource 218 include, but are not limited to, a data limit 226 defined for a set period of time, Quality of service priorities, a firewall configuration, ability to use peripheral devices such as printers, services, and the like.

While the following discussion will describe specific, non-limiting examples of network functionalities 210, it should be noted that other embodiments of the contemplated system 100, device 102, and method may manage additional, fewer, or altogether different network functionalities 210. The contemplated mutable network device 102 facilitates the definition and provisioning of different functionalities 210, and is not limited in which functionalities 210 can be provided and managed, according to various embodiments.

It is important to note the distinction between a network policy 134 and a network functionality 210. A network functionality 210 describes, in part, a wireless network 116, an interaction with a wireless network 116, and/or an interaction within a wireless network 116, when it is applied to said wireless network 116. A network policy 134 defines at least part of a network connection with or through a wireless network 116 by specifying or describing one or more network functionalities 210 to be applied to said wireless network 116. In some cases, a network policy 134 also defines and governs the conditions or circumstances of when or how the specified one or more network functionalities 210 is to be applied. Thus, some network policies 134 may simply specify one or more network functionalities 210, and other network policies 134 may specify one or more network functionalities 210 along with defining the conditions for application of said functionalities. Both types of network policy 134 are discussed below.

The mutable network device 102 is configured to define, or receive administrator 122 input to define, a first set of network policies 202 associated with a first passphrase 200 for the wireless network 116, and a second set of network policies 206 associated with a second passphrase 204 for the wireless network 116, with the second passphrase 204 being different from the first passphrase 200, according to various embodiments. While this disclosure will focus on these two passphrases and their associated sets of network policies 134 in order to better illustrate the advantageous ability of the contemplated mutable network system 100 and device 102 to provide different functionality to different client devices 118 based upon the passphrase used, other embodiments may utilize more than two unique passphrases.

According to various embodiments, a first set of network policies 202 is associated with a first passphrase 200 within the mutable network device 102. In some embodiments, this association may be accomplished through some form of lookup table 207, listing different passphrases along with the associated set of network policies, either by reference or by value. In other embodiments, a passphrase may be associated with a set of network policies using any other method known in the art.

In some embodiments, the mutable network device 102 is used in conjunction with a wireless network 116 that uses a security protocol that comprises the passphrase never actually being directly transmitted over the air (e.g., WPA, WPA2, etc.). In such cases, the association between a passphrase and a set of network policies may also include an association with a cryptographic key 238 that is generated based, at least in part, upon the passphrase. Doing this would reduce the number of operations needed to determine which passphrase is being used for each time a new connection is authenticated to the wireless network 116. As a specific example, in an embodiment using the WPA2 standard, A Pairwise Master Key (PMK) is an intermediate key that is generated using the SSID of the wireless network 116 and the passphrase or Pre-Shared Key (PSK) as part of the four-way handshake process for authentication. While the PMK is not transmitted, it is used in calculations that ultimately generate a Message Integrity Code (MIC) that is transmitted. Storing the PMK for each passphrase means the PBKDF2 algorithm only needs to be applied once to generate the PMK, not every time there is a new authentication. The four-way handshake will be discussed in greater detail with respect to FIG. 4, below.

In some embodiments, in addition to being associated with a passphrase, a set of network policies 134 may also be associated with, or require, a particular unique identifier 112. In some embodiments, a set of network policies 134 may require the use of a particular passphrase and that the passphrase is being used to authenticate a client device 118 having a particular unique identifier 112. In other embodiments, the interface and mechanisms provided for an administrator 122 to define a set of network policies 134 may also allow them to define policies that are tied to specific unique identifiers 112, as is done in conventional network management solutions known in the art.

While the passphrases being associated with different sets of network policies 134 must obviously be unique, the sets of network policies 134 do not. The association of two different passphrases with the same set of network policies 134 is not precluded, according to various embodiments. However, one of the novelties that makes the contemplated mutable network system 100, device 102, and method advantageous over conventional wireless network hardware and methods is the ability to provide different functionality to different client devices 118 based entirely on what passphrase they use to authenticate to the network. Thus, it is worth noting that in the non-limiting example of a first set of network policies 202 and a second set of network policies 206 shown in FIG. 2, there is a unique network policy 212 that is part of the second set, but not in the first set. In other examples, the unique network policy 212 could be a network policy 134 that is present in both sets, but is configured differently. A network policy 134 can be said to be found exclusively in one set by virtue of the configuration details, not just by the type of policy.

FIG. 2 shows a schematic representation of a number of examples of network policies 134, arranged in sets. The following discussion of these examples is not meant to be exhaustive. According to various embodiments, a network policy 134 may be defined to specify any network functionality 210, with or without conditions or constraints.

A scheduled network policy 220 is a policy that conditions the periodic application of one or more network functionalities 210 on a schedule 222 that is defined within the policy 220. In some embodiments, including the non-limiting example shown in FIG. 2, a scheduled network policy 220 may specify a network access 214. In other embodiments, it could be a network filter, as will be discussed below. In still other embodiments, the scheduled network policy 220 may be used to schedule the application of any network functionality 210, including but not limited to the network functionalities 210 represented schematically in FIG. 2 and/or discussed herein.

In some embodiments, a scheduled network policy 220 may comprise a schedule 222 and one or more network functionalities 210 that are only applied when permitted by the schedule 222 (i.e., the schedule 222 specifies states of 'on' or 'off' for the specified network functionalities 210). In other embodiments, the schedule 222 may instead describe a change in which network functionalities 210 are being applied. For example, it may be configured such that a first functionality is applied from 12 am to 8 am, a second functionality applied from 8:01 am to 9 pm, and a third functionality from 9:01 μm to 11:59 pm, every day. According to various embodiments, the schedule 222 may repeat on a daily basis, a weekly basis, or a monthly basis. In other embodiments, the schedule 222 may not be repeating, and instead specify a window of time in which a network functionality 210 such as access to a high speed internet connection is available, after which the connection is limited to lower speeds.

As a specific example, in one embodiment, a family may configure a passphrase for the kids to use on their various devices. The passphrase may be associated with a scheduled network policy 220 that will only allow access to the Internet during a particular window of time. At the same time, the parents may use the same wireless network 116, having the same SSID, but with a passphrase or passphrases that are not associated with that network policy 134. The scheduled network policy 220 and its application to this particular use case will be discussed in greater detail with respect to FIGS. 6-8, below.

According to various embodiments, the scheduled policy 220, along with other policies discussed herein, is implemented and enforced by a traffic kernel module 136, as discussed above. In some embodiments, the traffic kernel module 136 interacts with various other entities (not shown) defined in the memory 106 and executed on the processor 104 of the mutable network device 102, including an authenticator (e.g., the process which handles the four way handshake discussed below, the entity that can determine which passcode is being used by a client device 118, etc.), a a scheduler, and a configuration agent (e.g., the interface through which policies 134 are defined and distilled into a format that can be implemented by the traffic kernel module 136, the authenticator, and the scheduler, etc.). The scheduler will tell the kernel module 136 when to enforce certain policies 134, such as when to turn on and off network access. As will be discussed below, in some embodiments turning off access means redirecting to the captive portal that indicates the network is scheduled off. In some embodiments, there may also be a web server running on each access point 103 which gets configured by the configuration agent. Thus, if the client device 118 is redirected to the web server's captive portal and enters a correct password in the web UI, it will allow access to the network for a configured period of time (default 4 hours), according to various embodiments.

In the context of the present description and the claims that follow, a population policy 228 is a network policy 134 comprising a network access 214 and a population limit 232. The population policy 228 constrains the number of client devices 118 authenticated through use of a specific passphrase 230 and permitted to concurrently use the network access 214 to be, at most, equal to the population limit 232, according to various embodiments. As a specific example, in one embodiment a hotel or resort may issue a different WiFi passphrase to each guest, but the passphrase can only be used to authenticate one or two devices at any given time, to prevent abuse of the wireless network.

In the context of the present description and the claims that follow, a default network policy 234 is a network policy 134 that specifies one or more network functionalities 210 that are applied to every network connection associated with the mutable network device 102, unless preempted by another network policy 134. In other words, a default network policy 234 could be thought of as being automatically added to every set of passphrases associated with a passcode by the mutable network device 102. According to various embodiments, any network policy 134 or set of network policies may also be specified as the default network policy 234, to be automatically applied as though it is associated with every passphrase. It should be noted that being a default network policy 234 does not automatically mean the conditional nature of some network policies 134 is changed. Being a default network policy 234 only means it is considered to be associated with every passphrase, and any condition defined as part of said policy will be evaluated as it would be if the policy had been explicitly added to a set of policies associated with a passphrase.

Continuing with the previous specific example of the resort, the population policy 228 could be declared a default network policy 234, such that it if automatically associated with any new passphrases created within the mutable network system 100. The ability to define one or more default network policies 234 within the mutable network system 100 is particularly advantageous in use cases where a number of passphrases are in use, or are frequently created for temporary use. Another example may be the automatic generation of a unique Wi-Fi passphrase at the bottom of each receipt at a coffee shop, limiting the use to customers and also automatically applying the set of network policies 134 desired for the customers to have.

As previously stated, the default network policy 234 is applied to every client device 118, independent of what passphrase was used to authenticate, unless it is preempted by another network policy 134. In some embodiments, network policies 134 may have an inherent priority, such that a default network policy 234 will have a lower priority than a policy explicitly associated with a passphrase, if they are of the same type or if there is functional overlap. In such embodiments, preemption of a default network policy 234 that is a scheduled network policy 220 limiting access to a storage device 126 to business hours would be accomplished by either a scheduled network policy 220 limiting that same access to a different schedule, or a network policy 134 defining a network access functionality 214 granting access to the storage device 126.

In other embodiments, a default network policy 234) may be preempted by the use of a policy exception 236. In the context of the present description and the claims that follow, a policy exception 236 is a network policy 134 that preempts and negates the default network policy 234. In some embodiments, associating a policy exception 236 with a passphrase effectively removes all default network policies 234 from the set of policies associated with that passphrase. In other embodiments, a policy exception 236 may indicate specific policies that are not to be applied as a default network policy 234 to any passphrases associated with said policy exception 236, allowing some defaults to apply and others not. As an option, in some embodiments, a policy exception 236 may also be associated with, and automatically applied to, a client device 118 having a particular unique identifier 112 (e.g., MAC address, etc.).

In the context of the present description and the claims that follow, a usage policy 224 is a network policy 134 that constrains some aspect of how the client device 118 is making use of the wired network 114. According to various embodiments, the usage policy 224 may be constraining a network resource 218 (e.g. a data limit 226 over a period of time, etc.) and/or a network capacity 216 (e.g., a bandwidth 208, a throughput, upload rate, download rate, etc.). In some embodiments, the usage policy 224 may be defined such that the functionality (i.e., network capacity 216 and/or network resource 218) is made available until the condition is satisfied, after which the functionality is removed.

In other embodiments, the usage policy 224 may define functionality or functionalities for both before the condition is satisfied and after the condition is satisfied. As a specific example, in one embodiment, a passphrase may be associated with a usage policy 224 that permits a client device 118 authenticated with said passphrase a set data limit each day at unlimited speeds (by policy, not physics). Any additional data beyond that limit (i.e., activity after the condition of "amount of data transferred" has been satisfied) would be limited to 20 Mbps for the rest of that day. This example also illustrates how there is overlap between network functionality types, as well as between functionality and constraint. Here, the data limit was the constraint that governed the application of a network capacity 216 (i.e., bandwidth 208) functionality through the usage policy 224. Elsewhere, a data limit 226 may be seen as a network resource 218, being a limited amount of data that can be transferred.

One network policy 134 not shown in FIG. 2 is a network filtering policy, which applies a filter on the network connection of the client device authenticated with an associated passphrase. According to various embodiments, the filter may be at least one of a content-based filter and an application-based filter. As a specific, non-limiting example, a content-based filter may be appealing to parents seeking to block inappropriate web traffic from the passphrases used to connect their children's' devices to the home wireless network 116. In that same context, an application-based filter could be used in a scheduled network policy 220 such that certain online games are blocked within the home network during times set aside for schoolwork or after bedtime.

Another network policy 134 not represented in FIG. 2 is a dynamic network policy. Like other network policies 134, a dynamic network policy is a policy that specifies one or more network functionalities 210 a makes their application conditioned on the satisfaction of a defined set of circumstances. However, a dynamic network policy is unique in that the conditions used to decide if or how network functionalities 210 are to be applied is based, at least in part, on something external to the wireless network 116. According to various embodiments, the dynamic network policy governs the application of specified network functionalities 210 based upon information received from outside the mutable network system 100. The ability to condition network functionality on events outside the mutable network system 100 makes it easier to integrate the mutable network system 100 and device 102 into existing setups, or to take advantage of new technologies.

According to various embodiments, a dynamic network policy may be based upon an action of a user 120 that is associated with the client device 118 authenticating with the passphrase associated with the dynamic network policy. In some embodiments, this action may be an interaction with another system, such as another authentication system or a social media site. The dynamic network policy typically interacts with a device such as a server 124 that is outside the mutable network system 100 to obtain the information needed to determine whether the condition has been satisfied, according to various embodiments.

In some embodiments, the one or more network functionalities 210 may only be applied until the condition is satisfied, while in other embodiments, they may only be applied after the condition is satisfied. In still other embodiments, the dynamic network policy may be specified such that some network functionalities 210 are applied before the condition is satisfied, and other network functionalities 210 are applied after the condition is satisfied.

In some embodiments, a dynamic network policy may be limited to the consideration of a single condition, allowing the dynamic network policy to condition the application of specified network functionalities 210 across two states (e.g., true or false, on or off, etc.). In other embodiments, a dynamic network policy may specify multiple conditions, giving the dynamic network policy three or more states to which one or more specified network functionalities 210 may be tied.

In an exemplary application, a client device 118 using a passphrase associated with a dynamic network policy may have a limited bandwidth 208 for their network connection until the user 120 authenticates themself through a portal or within a social media service, after which a higher bandwidth 208 is applied to the connection. As a specific example, this capability could be used in a coffee shop or small cafe, where it could be integrated with a customer loyalty program (e.g., create an account and provide your email through a captive portal for faster Wi-Fi, etc.) or a promotion that rewards customers for actions such as posting on social media with the business tagged. The capability to do such things would not be possible using conventional hardware and techniques that would be practical for a small business. The contemplated system 100, device 102, and method make it possible to provide such features on equipment that is accessible to consumers and small commercial buyers.

Figure 3:
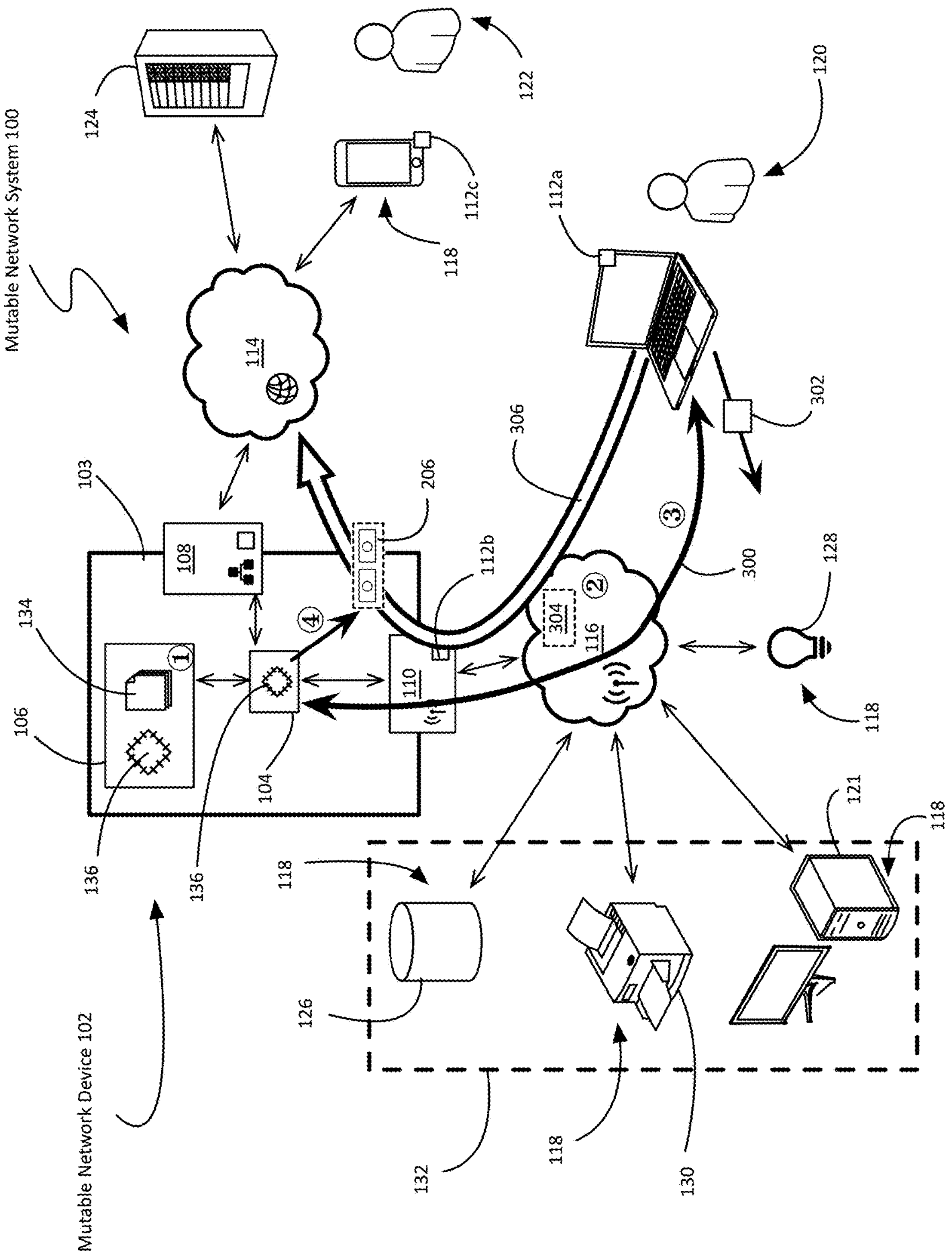
FIG. 3 is a schematic network view showing a process flow of the contemplated method within a mutable network system.

FIG. 3 is a network view showing a process flow for a non-limiting example of the contemplated method for modifying functionality within a wireless network 116 based on a provided passphrase. First, a first set of network policies 202 and a second set of network policies 206 are defined and associated with a first passphrase 200 and a second passphrase 204, respectively. See circle '1'. According to various embodiments, the mutable network device 102 may provide an interface to a configuration agent (e.g., a web page served over the network by a web server running on the mutable network device 102, a network interface for an app or an externally hosted configuration interface, etc.) through which the administrator 122 is able to define sets of network policies 134, and associate them with unique passphrases. The configuration agent then distills the defined policies and the associated passcodes into an appropriate format (e.g. text file, JSON files, etc.) that other processes such as the traffic kernel module 136, the authenticator, and the scheduler can read and execute.

Next, a client device 118 is authenticated with the wireless network 116 through an authentication process 300. In this non-limiting example of the contemplated method being implemented with a mutable network system 100, the mutable network device 102 is also an access point 103, as shown in FIG. 3. In this specific embodiment, the mutable network device 102 is the only access point 103, meaning the entire wireless network 116 is provided solely by the wireless network interface 110 of the mutable network device 102. This is expected to be typical in embodiments targeted at basic consumer use, such as a in a single family home. In other embodiments, the mutable network device 102 and the access point 103 or access points 103 may be separate devices, as previously discussed.

In this embodiment, where the mutable network device 102 is also the access point 103, a Service Set Identifier (SSID) 304 for the wireless network 116 is broadcast through the wireless network interface 110 of the mutable network device 102. See circle '2'. Advantageous over conventional systems, the mutable network system 100 is able to provide a variety of network functionalities through a single SSID, something that would require the use of multiple SSIDs in conventional wireless network solutions.

The SSID 304 is shown as part of the wireless network 116 in FIG. 3. In some ways, the SSID 304 and the wireless network 116 are synonymous. The SSID 304 is the identifier presented to client devices 118 that may be looking to join a network; it is the public face of the wireless network 116, from the point of view of a client device 118. Within some contexts, the SSID and the concept of a wireless network are interchangeable.

According to various embodiments, the authentication process 300 is initiated in response to the mutable network device 102 receiving a connection request 302 from the client device 118 that is directed to the SSID 304. The mutable network device 102 is designed to engage in an authentication process 300 with the client device 118, either directly as the access point 103 or indirectly through a separate access point 103, to secure a network connection 306 between the client device 118 and the wireless network 116, while at the same time determining which of the two or more passphrases are being used by the client device 118 (again, this discussion is in the limited context of a two passphrase use case, for simplicity). See circle '3'.

In some embodiments, the passphrase used may be determined directly (e.g., the passphrase is transmitted over the air). In other embodiments, the identity of the passphrase may be determined through cryptographic keys 238 shared during the authentication process 300. As a specific example, in some embodiments, the authentication process 300 may be a four-way handshake between the access point 103 (here, the mutable network device 102) and the client device 118. The four-way handshake will be discussed in greater detail with respect to FIG. 4.

In other embodiments, a different authentication process 300 may be utilized. Those skilled in the art will recognize that while the nature of what is being shared over the air may differ between security protocols, both known and not yet developed, the cryptographic key(s) 238 that are transmitted so the passphrase can be authenticated may also be used by the mutable network device 102 to determine which set of network policies 134 should be applied over the resulting network connection 306.

Finally, once the mutable network device 102 has determine what passphrase was used in the authentication process 300, it configures a traffic kernel module 136 to be loaded into the kernel of the access point 103 (here, the mutable network device 102) that will provide the network connection 306 to the client device 118 upon successful completion of the authentication process 300. See circle '4'. As a result of the traffic kernel module 136, the network connection 306 will be defined, at least in part, by the first set of network policies 202 if the provided passphrase 402 is the first passphrase 200, or defined at least in part by the second set of network policies 206 if the provided passphrase 402 is the second passphrase 204, in this simple two passphrase exemplary use case.

Figure 4:
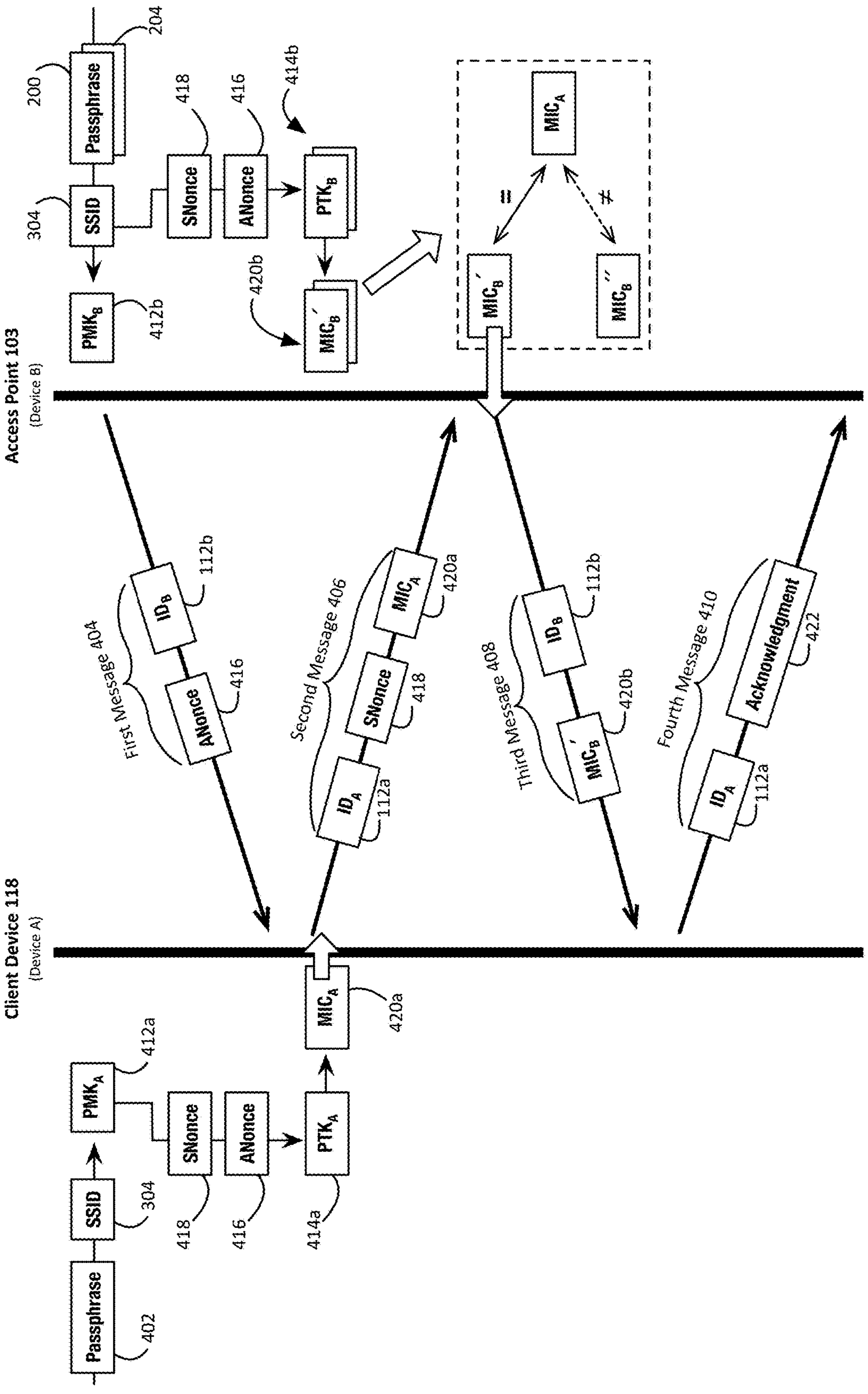
FIG. 4 is sequence diagram of an authentication process.

FIG. 4 is sequence diagram of a non-limiting example of an authentication process 300. Specifically, FIG. 4 shows a four-way handshake 400 between a client device 118 and a mutable network device 102 that is also an access point 103. It should be noted, however, that most of the elements of this sequence diagram attributed to the mutable network device 102 would belong to an access point 103 were it distinct from the mutable network device 102, as it is in some embodiments. The aspects of the sequence diagram shown in FIG. 4 that might deviate from a traditional four-way handshake 400 (i.e., due to more than one potential valid passphrase) are surrounded by a dashed box. Furthermore, some embodiments of the mutable network device 102 are built around the IEEE WPA2-PSK standard, which natively offers the ability to configure a SSID 304 with multiple passphrases. In other embodiments, though, the contemplated method may be implemented with a wireless network 116 using other security standards, including standards not yet existing, so long as the client device 118 is able to authenticate with a passphrase or some other value.

The specific ways a four-way handshake 400 may be modified for use in conjunction with the mutable network system 100 will be indicated below, with the bulk of the discussion referring to the device as an access point 103. It is important to remember, though, that in some embodiments the access point 103 is also a mutable network device 102.

As is known in the art, the four-way handshake 400 is an authentication process 300 for obtaining access to service(s) and connectivities provided by a wireless network 116. This handshake 400 allows the client device 118 and the access point 103 to prove to each other they are who they claim to be. In this specific, non-limiting example, the four-way handshake 400 utilizes a passphrase, also called a pre-shared key (PSK), while never broadcasting the passphrase over the air.

The four-way handshake 400 process comprises the transmission and reception of four messages between the access point 103 and the client device 118. The client device 118 and access point 103 will also be referred to as device 'a' and device 'b', respectively, mainly through the figure element numbers of elements they have in common. First, the access point 103 initiates the handshake 400 with a first message 404 comprising data needed to construct a pairwise transient key 414, or PTK. Specifically, an Authenticator Nonce 416 and the unique identifier **112*b* of the wireless network interface 110 of the access point 103** (i.e., the BSSID).

Upon receipt of the first message 404, the client device 118 has the information needed to calculate its own Pairwise Transient Key **414*a* (PTK 414*a*), using ANonce 416, a nonce-value associated with the client device 118 called the Supplicant Nonce or SNonce 418, both unique identifiers 112*a* and 112*b* (e.g., MAC addresses, BSSID, etc.), and the Pairwise Master Key 412*a* belonging to the client device 118. The Pairwise Master Key 412***a* is derived from the provided passphrase 402 being used by the client device 118 and the SSID 304 of the access point 103. The client device 118 then creates a Message Integrity Code 420*a* (MIC 420*a*), which is a cryptographic checksum calculated using the PTK 414*a* belonging to the client device 118.

The second message 406 is sent from the client device 118 back to the access point 103, SNonce 418, the unique identifier 112*a* of the client device 118 (e.g., MAC address), as well as the Message Integrity Code 420*a*. Upon receiving the SNonce 418 and the unique identifier 112*a* of the client device 118 the access point 103 constructs its own PTK 414*b*, which is then used to calculate the access point's own MIC 420*b*.

It is after the second message 406 of the four-way handshake 400 that the access point 103 is first able to determine which passphrase is being provided by the client device 118, according to various embodiments. This is accomplished by comparing the received MIC 420*a* with the calculated MIC 420*b*. If they match, then both devices used the same passphrase in their respective calculations. In the case at hand, in order to determine which passphrase was used (i.e., the first passphrase 200 or the second passphrase 204), the access point 103 would need to calculate a MIC 420*b* for each passphrase, hereinafter referred to as $MIC_b'$ for the first passphrase 200 and $MIC_b''$ for the second passphrase 204.

In determining which, if any, set of network policies 134 should be applied or enacted on the network connection 306 being established via the four-way handshake 400 between the access point 103 and the client device 118, the mutable network device 102 will need to compare the passphrase used by the client device 118 (i.e., the provided passphrase 402) with the passphrases stored in the memory 106. In embodiments where the provided passphrase 402 is broadcast over the air, or where the actual provided passphrase 402 is discernable by the access point 103, this comparison may be made between the provided passphrase 402 and the passphrases associated with various sets of network policies 134. In other embodiments, including the non-limiting example represented by FIG. 4, the provided passphrase 402 is not broadcast nor directly discernable. Instead, a cryptographic value (i.e., MIC 420*a*) is provided by the client device 118 for comparison. Thus, that same cryptographic value needs to be calculated for every passphrase stored in the memory 106 and associated with a set of network policies 134, until a match is found.

In some embodiments, that calculation may be performed starting from a plaintext passphrase each time a four-way handshake 400 is performed. In other embodiments, including the non-limiting example shown in FIG. 4, parts of the calculation that are reusable may be performed once and then stored along with the passphrases and sets of network policies 134 such that they are associated with their respective policies and passphrase. As a specific example, as shown in FIG. 4, the PMK 412 is part of the calculation that ultimately yields the PTK 414 which can be used to calculate the MIC 420 used for identifying the associated set of network policies 134. The PMK 412 is calculated using the passphrase and the SSID 304 of the wireless network 116, and is able to be reused for each handshake process. According to some embodiments, the PMK 412 (i.e., a cryptographic key 238) for each passphrase may also be stored in the memory 106, and also associated with a passphrase and a set of network policies 134. If an aspect of that calculation were to change, these reused values may be recalculated and stored again for future use. It should be noted that while this non-limiting example of a procedure for determining which passphrase is being provided to the access point 103 is specific to the WPA2 standard, other standards (e.g., WPA3, etc.) may be adapted to provide similar results, according to various embodiments.

After the second message 406 in the four-way handshake 400 is verified by a matching MIC 420, the client's eventual connection to the access point 103 will be configured to have the predefined network policies 134 in place. This is not part of the standard handshake process, but is instead triggered and enabled by said handshake, according to various embodiments.

As previously discussed, the network functionalities 210 that the access point 103 may be configured, through network policies 134, to provide in response to a particular passphrase include, but are not limited to, VLAN assignment/access, network type, permission to bypass a schedule or captive portal, and the like. Some of this configuration of the access point 103 may be done using conventional methods, according to various embodiments. As a specific example, in one embodiment, the provisioning of desired VLAN traffic may be treated in the same way a static VLAN assignment on a BSSID or a traditional RADIUS-assigned VLAN would be done (e.g., configured through the wireless driver of the access point 103, etc.). Any traffic to/from that client would be bridged to/from that desired VLAN for the duration of that client's connection to the access point 103.

In some embodiments, the provisioning of some network functionalities 210 may comprise operations at a lower level within the access point 103. According to various embodiments, the proprietary traffic kernel module 136 previously discussed monitors all packets passing through the access point 103, and may be implemented without using reserved VLANs. As a specific example, in one embodiment, if a client device 118 provided the passphrase associated with an Internet of Things (IoT) network type, the access point 103 would only allow frames destined to/from the Internet after the initial connection. However, if another client device 118 on the local network sends a packet to the IoT device 128, a channel will be opened to that IoT device 128 which allows the client device 118 to communicate with it, via whatever VLAN both devices are configured for. This is outside conventional operation, and may be accomplished through the contemplated traffic kernel module 136, according to various embodiments.

The handshake process continues, with the access point 103 sending a third message 408 (i.e., encrypted GTK 424 and MIC 420), and the client device 118 sending a fourth message 410 acknowledging the receipt of the GTK 424 with an acknowledgement 422, as is known in the art. At this point, both access point 103 and client device 118 will program the PTK 414 into their hardware encryption/decryption modules, and any further traffic will be encrypted/decrypted using that key. WPA2-AES uses this key to ensure that every frame is encrypted and "signed" using the Message Integrity Check (MIC 420). According to various embodiments and as is customary/designated in WPA handshakes, after the fourth message 410 in the handshake 400, the keys are programmed into the client- and AP-side hardware and the client device 118 is allowed to send/receive data frames, enjoying all the functionalities associated with the provided passphrase 402 that the client device 118 used and the access point 103 authenticated. According to various embodiments, when the client device 118 actual connects, the authenticator (i.e., hostapd) informs the traffic kernel module 136 what policies to enforce based on the passphrase used, now tied to the unique identifier 112*a* of the client device 118.

Figure 5:
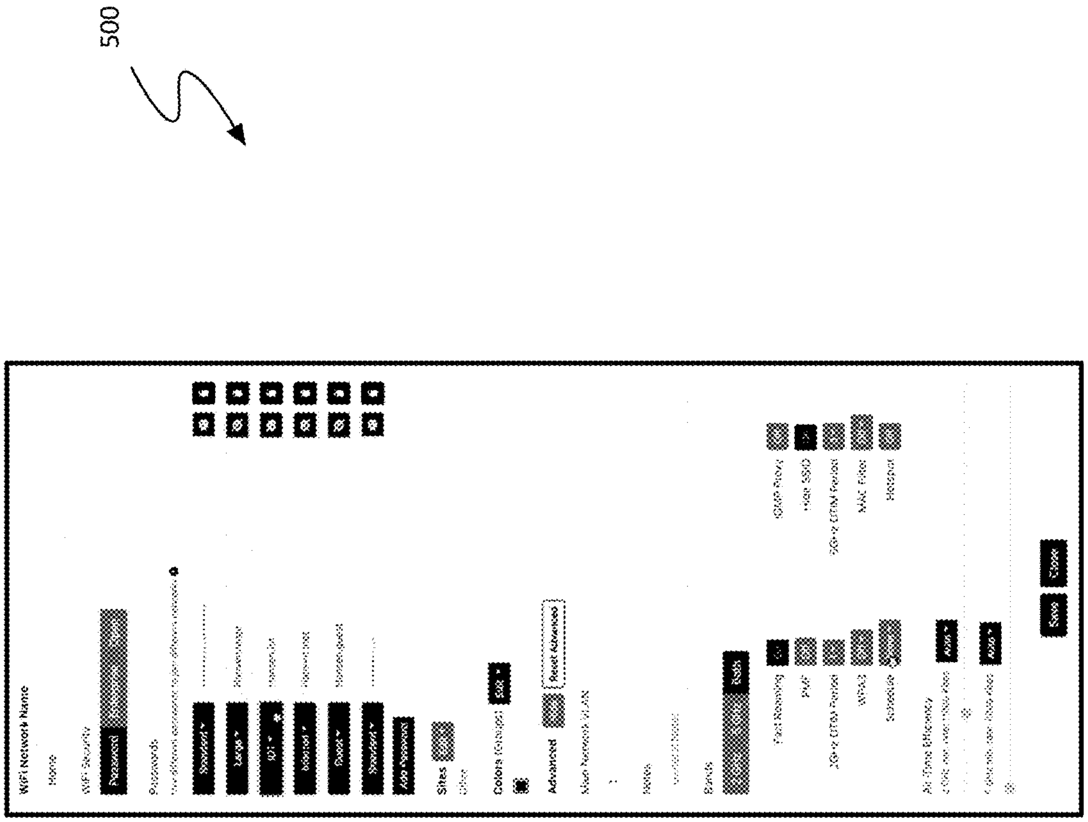
FIG. 5 is a configuration interface.

FIG. 5 is a non-limiting example of an administrator user interface 500 for configuring a mutable network system 100, according to various embodiments. As shown, the interface 500 allows for the definition of various passphrases which are associated with different network types, which may also be referred to as sets of network policies 134. In some embodiments, the network functionalities 210 that make up each of these network types may be predefined, and outside the end administrator's control (e.g., simplifying the system 100 to be operated and maintained by a novice consumer, etc.). In other embodiments, various characteristics of one or more of these network types may be defined or modified through the administrator user interface 500. In still other embodiments, the user configuring the system (i.e., the administrator 122) may be able to define custom network types.

The exemplary user interfaces shown are rendered by a web browser accessing an interface 500 provided by the contemplated mutable network device 102, according to various embodiments. In some embodiments, the mutable network device 102 may be configured through a web interface, while in other embodiments the mutable network device 102 may be configured and/or monitored by the administrator 122 through other interfaces including, but not limited to, an application, a mobile app, a command line interface (e.g., via SSH, etc.), and the like. In some embodiments, the administrator 122 may access the management/configuration/monitoring interface(s) remotely, over the Internet (as shown in FIG. 1), while in other embodiments the interfaces may be limited to access via a client device 118 local to the mutable network system 100 (e.g., on the wireless network 116, on a wired connection directly to the mutable network device 102, on a limited VLAN, etc.).

FIG. 5 shows various exemplary network types (i.e., sets of network policies 134), which will be discussed below. It should be noted, however, that this is not an exhaustive discussion of the network functionalities 210 that can be provided and managed by the contemplated system 100 using the contemplated method. As previously stated, the mutable network system 100 and device 102 may be used to manage any network functionality 210 that may be provided to the client device 118 of a user 120, based on the passphrase they provide, according to various embodiments. Thus, this system 100 and device 102 may be used with other "types" of networks beyond the non-limiting examples discussed below, as well as with network functionalities beyond the examples provided herein.

A "standard" or "small" network may refer to a wireless network 116 that is configured for use with a limited number of client devices 118 (e.g., less than 100 Wi-Fi devices, etc.). In some embodiments, this network type may provide unrestricted layer-2 network access, and may meet the most basic needs of consumer-level applications (i.e., providing client devices 118 access to LAN/WAN). On the other hand, a "large" network is optimized for large numbers of Wi-Fi devices (e.g., hundreds, thousands, etc.). As a specific example, in some embodiments of a "large" network, wireless broadcast traffic may be restricted while also employing proxy ARP and proxy MDNS to enable device-to-device communication. While these size optimizations are the primary characteristics of the standard/small and large network types, in some embodiments such optimizations, big or small, may also be provided by some or all of the other network types (e.g., a default network policy 234, etc.).

An "Internet-only" network may restrict connected client devices 118 to communicate solely with a VLAN's router, preventing access to other assets within the local network. A similar concept is seen in the "Guest" network type, where the client device 118 is restricted to communication with the VLANs router, in addition to IoT-type devices on the wireless network 116. As a specific example, a consumer-level use case for the "guest" network would be to allow a visitor in the home to have access to the Internet, as well as various smart appliances and fixtures such as lights, sensors, speakers, and the like, without providing the ability to communicate with home computing devices or equipment such as a printer 130 or NAS 126.

The "IOT" network type may be restricted to communication with the VLAN's router (i.e., Internet-only access), and can also be reached by other client devices 118 on the wireless network 116 if they initiate the connection. However, the client devices 118 on an "IoT" type network (i.e., IoT devices 128) cannot initiate connections to other devices on their own. In other words, they can respond to questions and requests, but are not allowed to start conversations with the local devices. This provides a greater degree of security to the other devices being networked by the same systems. In the past, IoT devices 128 have provided an attractive attack surface for network intruders, since many IoT devices 128 lack the ability for much beyond authenticating to join a network 116, due to the need to minimize expense and/or power consumption. The "IoT" network type limits the type of attacks possible through an IoT device 128.

Additionally, in some embodiments, the contemplated mutable network device 102 may also be configured to provide one or more VLAN interfaces, which may be in addition to VLANs utilized to create the network types previously discussed. Also, in some embodiments, the administrator interface 500 may also allow an administrator 122 to force a specific network type based on the device's unique identifier 112 (e.g., MAC address, etc.). While this may defeat some of the purpose of attaching functionalities to passphrases, it may be beneficial to be able to define a separate set of network policies 134 for a subset of an already existing and authenticated group of client devices 118, without requiring that subset to be reintroduced to the wireless network 116 with a different passphrase. This may be of great benefit in situations where there is a large number of client devices 118 that stay attached to the wireless network 116 (e.g., IoT devices 128, computers 121 in a library or school, etc.).

As shown in FIG. 5, the administrator interface 500 may also allow the administrator 122 to define other characteristics of a wireless network 116 or access point 103. Examples include, but are not limited to, frequency band, broadcast settings, air-time efficiencies, and any other network attribute known in the art. As a specific example, in one embodiments, a single SSID 304 may be overloaded to provide access across multiple bands, under a single passphrase. This is advantageous over the traditional approach of providing a different SSID 304 for each band, often leading users to be confused as to which network they should join. In some embodiments, the mutable network device 102 may employ the IEEE 802.11k and 802.11v standards to give the client devices 118 informed decisions on which band to use.

In some embodiments, communication between two different network types may be facilitated. For example, in one embodiment, if two different passphrases allow two different client devices 118 to join two different VLANs, those devices 118 will not be able to communicate with each other unless there is a router that routes traffic between the two VLANs. VLANs are each discrete layer-2 networks by definition, and devices can only communicate across VLANs via a separate router. Some embodiments of the contemplated system also bridge/route VLANs for this and other purposes (e.g., automatic backup of network routing via the access point 103 for cases when the DHCP server does not reply, etc.).

However, client devices 118 on the same VLAN are allowed to communicate with each other unless a network policy 134 inhibits frames from being bridged between the clients. This filtering occurs regardless of the clients being connected to the same access point 103 or different access points 103, according to various embodiments. For example, in one embodiment, Internet-only clients will pass traffic on to the VLAN that they are configured for, but any frames that are not destined for the gateway will be dropped by the access point 103.

As discussed with respect to FIG. 2, a scheduled network policy 220 allows an administrator 122 to condition the provision of one of more network functionalities 210 on a schedule 222. For example, according to various embodiments, access to the wireless network 116 may be enabled or disabled based on this schedule 222. This is an attractive functionality on the consumer-level. As a specific, non-limiting example, a family may configure the mutable network device 102 to provide a wireless network 116 in the home for parents and children, all under the same SSID 304. The passphrase used to join the kids to the network 116 may be linked to the scheduled network policy 220 providing internet access that may be disabled at times when the children are supposed to be doing schoolwork or in bed sleeping.

Figure 6:
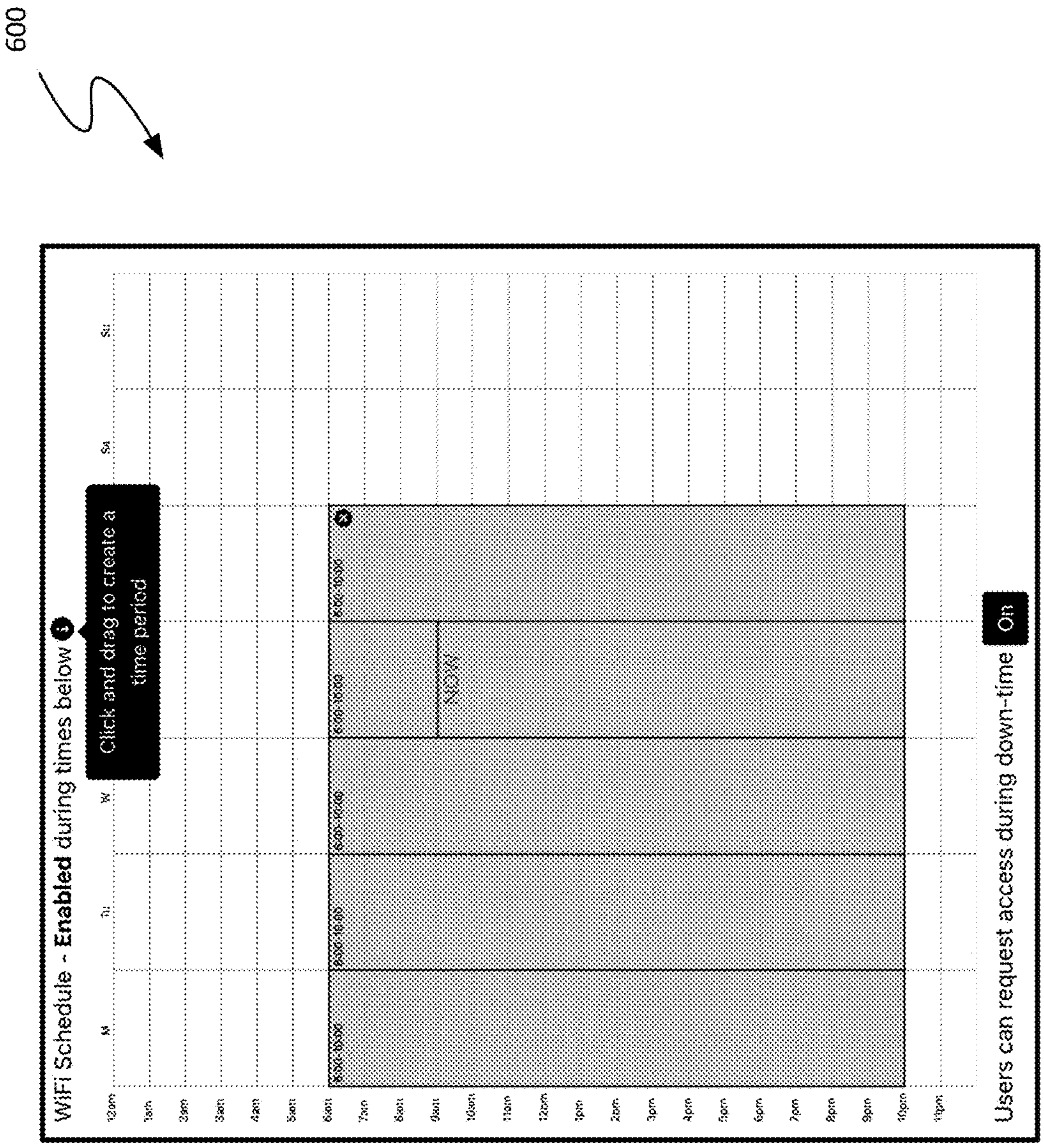
FIG. 6 is a configuration interface for a scheduled network policy.

FIG. 6 is a non-limiting example of a user interface 600 for defining a schedule 222 for a scheduled network policy 220. In some embodiments, the schedule 222 may also be modified through an API. As shown, the schedule 222 may be configured by dragging blocks of time around a week calendar, similar to some calendar software. The blocks may be used to define a particular state of the network 116, whether it is enabled or disabled, or other functionalities.

Some conventional network systems allow for the definition of similar access schedules. However, those conventional systems disable the network 116 completely when the schedule dictates that it should be disabled, causing the network 116 to cease broadcasting the SSID 304, becoming invisible to users who cannot manually provide the SSID 304. Advantageously, the contemplated system 100 and device 102 are able to disable the network access according to a schedule 222, and still broadcast the SSID 304 while that access is disabled for some. In some embodiments, this allows for the network 116 under one passphrase to be disabled per the schedule 222, but that same SSID 304 accessed with a different passphrase may be operating as usual.

Figure 7:
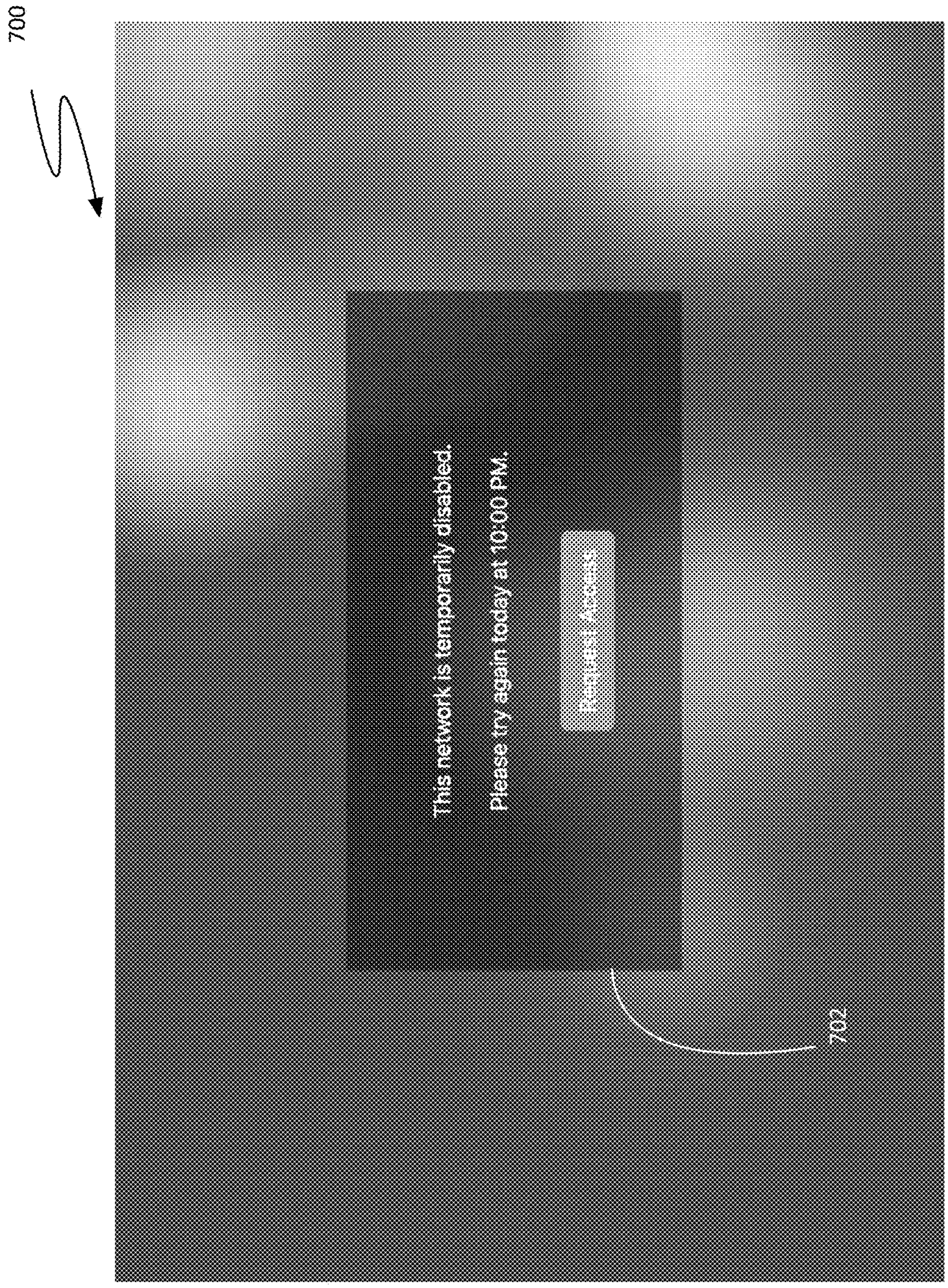
FIG. 7 is a captive portal with a user interface.

According to various embodiments, during the period of time when wireless network access is disabled by the schedule 222, the SSID 304 continues to be broadcast so that client devices 118 can try to connect. However, instead of providing full access, a captive portal 700 may be presented to the user 120, indicating that the wireless network 116 is currently offline. FIG. 7 shows a non-limiting example of such a captive portal 700. In some embodiments, the administrator 122 may configure the captive portal 700 to indicate that a user 120 can request a schedule exception, or access outside the defined schedule 222 (e.g., the "request access" button, etc.).

FIG. 7 is a non-limiting example of a captive portal 700 with a user interface 702. In some embodiments, the contemplated mutable network device 102 may be configured with a captive portal 700, allowing the access point 103 to serve as a hot spot that redirects a client device 118 to a specific pages upon first connecting. For example, a coffee shop may provide free WIFI, displaying the passphrase to gain access on a sign. Upon connecting with that passphrase, the user 120 is presented with a branded welcome page, which the coffee shop may use to promote specials or events, or take the user 120 to a customer loyalty sign-up page.

In some embodiments, the administrator interface 500 of the mutable network device 102 may be used to create a captive portal 700. Similar to the schedule functionality previously discussed, in some embodiments this captive portal 700 may be displayed to everyone, while in other embodiments it may only be shown to people using a particular passphrase. Furthermore, in some of the embodiments where the captive portal 700 is the default, a passphrase may be given the ability to "Bypass Hotspot" (see FIG. 9). A user authenticating with such a passphrase is never shown the captive portal 700 that is being enforced on other users, according to various embodiments.

Figure 8A:
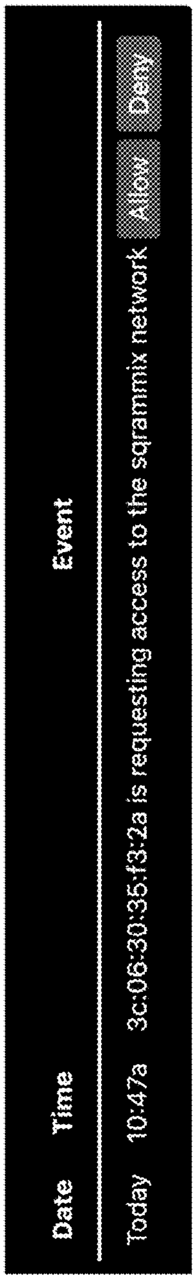
FIGS. 8A and 8B are network administrator messages.
Figure 8B:
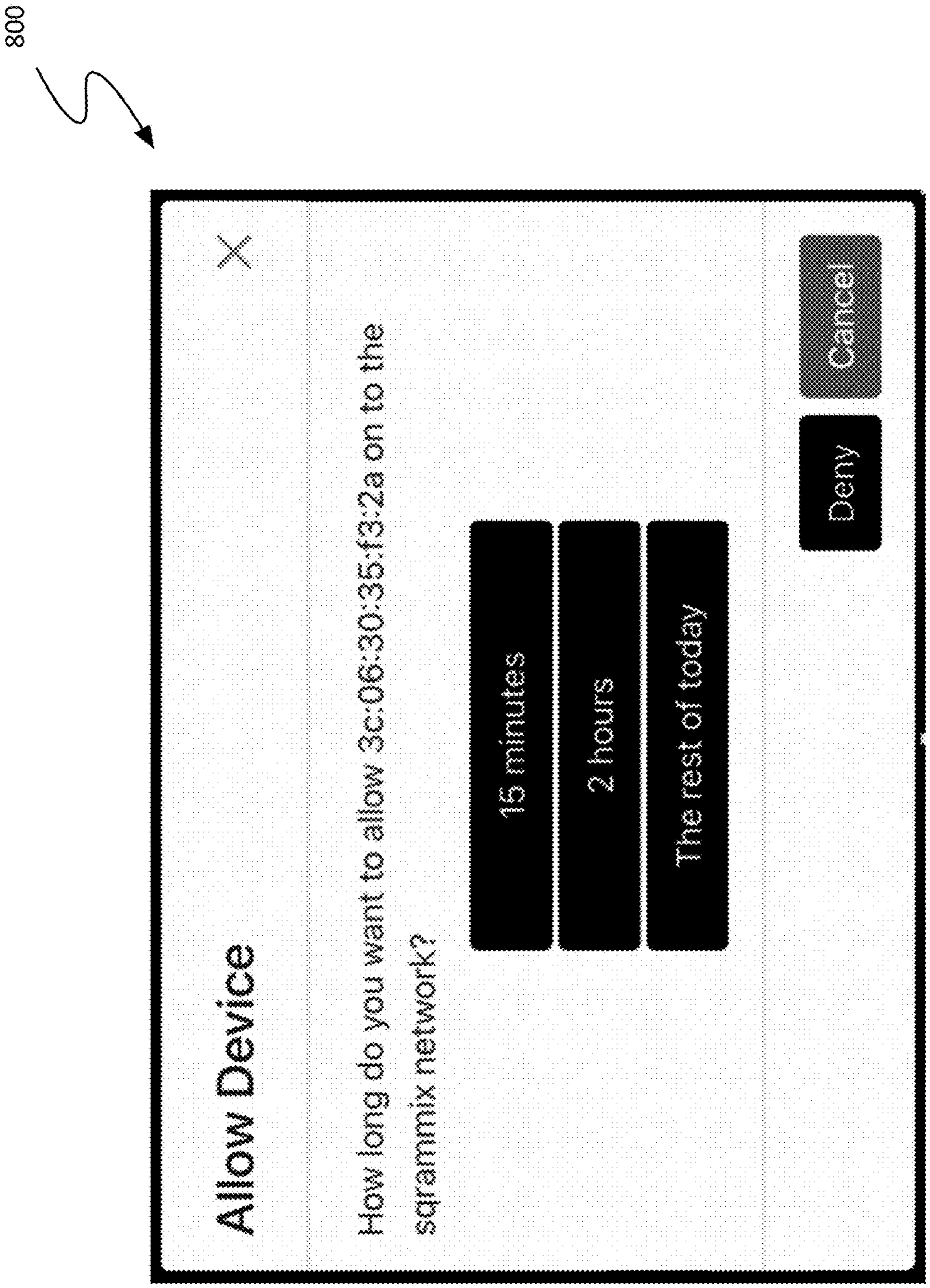

FIGS. 8A and 8B are non-limiting examples of network administrator notifications 800. In some embodiments, if the user requests access to the otherwise unavailable wireless network 116 (e.g., during scheduled downtime, etc.), the network administrator 122 will be notified of the pending request. The administrator 122 can then allow or deny the user's request, as shown in FIGS. 8A and 8B, according to various embodiments. In some embodiments, the administrator 122 may be notified and able to respond through standard and mobile interfaces. In some embodiments, the ability to make such a request may be passphrase-dependent, while in other embodiments it may be an option provided to all authenticated client devices 118. Upon receiving permission from the administrator 122, the client device 118 is immediately allowed access to the defined functionalities associated with their passphrase, according to various embodiments.

Figure 9:
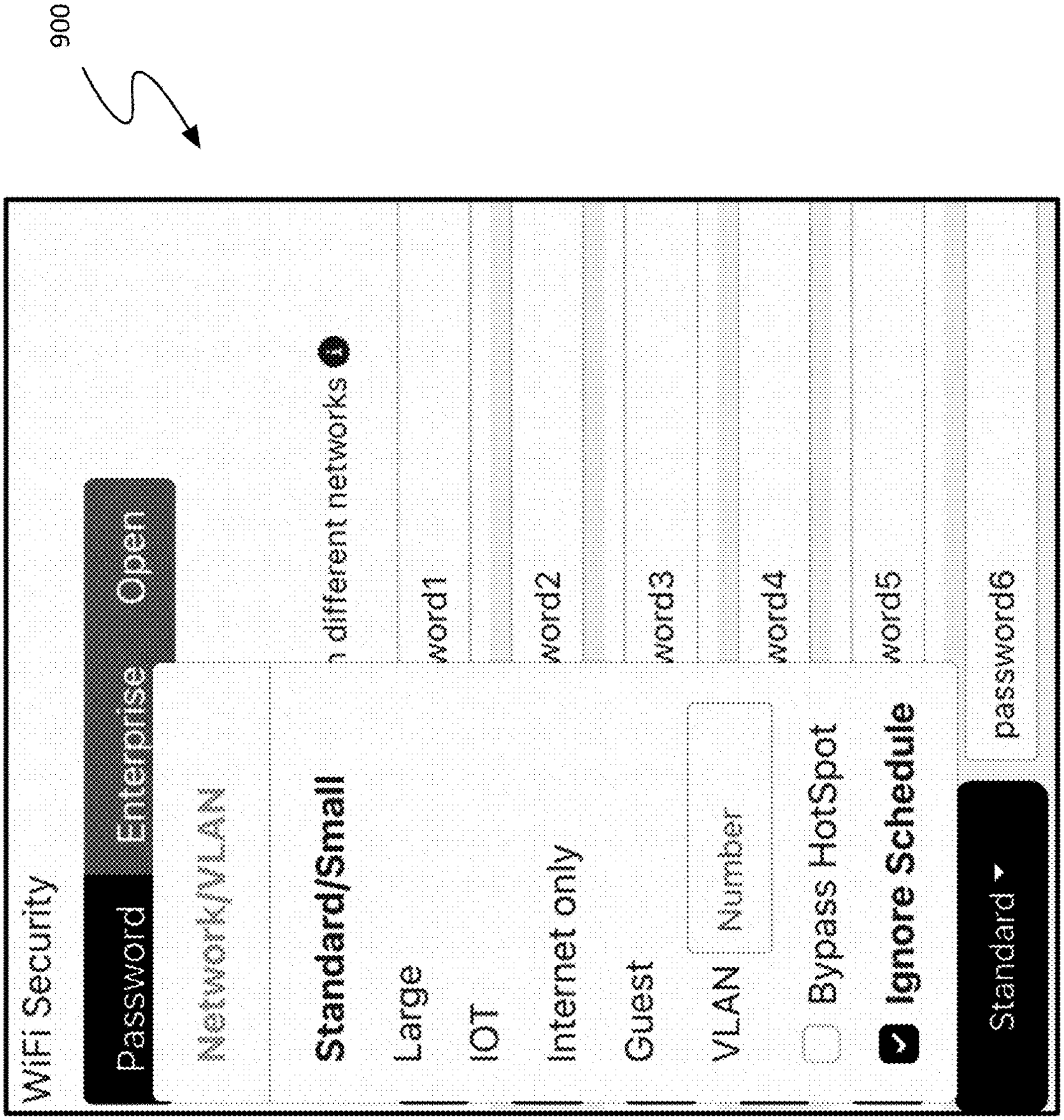
FIG. 9 is a configuration interface for defining a policy exception.

In some embodiments, a schedule 222 may be defined on a per-passphrase basis. In other embodiments, the definition of a schedule may be applied to all access, unless an exception is made (i.e., a default network policy 234). FIG. 9 shows an exemplary interface for defining the functionalities under a passphrase. One option provided is "Ignore Schedule". A passphrase configured to ignore the scheduled network policy 220 will have full access to the network and functionalities connected to that passphrase, at any time. Returning to the example of setting a schedule for a home network so the kids aren't able to stream videos all night instead of sleeping, the parents would most likely prefer to make their network use decisions on their own, and not on a schedule. By defining a passphrase that has "Ignore Schedule" enabled, the adults can get on the network at any time, and are never presented with the captive portal 700, even if the schedule has disabled the same network for devices using a different passphrase that does not ignore the schedule. Furthermore, in some of the embodiments where the captive portal 700 is the default, a passphrase may be given the ability to "Bypass Hotspot" (see FIG. 9). A user authenticating with such a passphrase is never shown the captive portal 700 that is being enforced on other users, according to various embodiments.

Where the above examples, embodiments and implementations reference examples, it should be understood by those of ordinary skill in the art that other mutable network systems, devices, and methods could be intermixed or substituted with those provided. In places where the description above refers to particular embodiments of a mutable network system, device, and method, it should be readily apparent that a number of modifications may be made without departing from the spirit thereof and that these embodiments and implementations may be applied to other to wireless network management technologies as well. Accordingly, the disclosed subject matter is intended to embrace all such alterations, modifications and variations that fall within the spirit and scope of the disclosure and the knowledge of one of ordinary skill in the art.

What is claimed is:

1. A mutable network device for a wireless network, comprising:

a wired network interface communicatively coupled to a wired network;

a processor and a memory, the processor communicatively coupled to the wired network interface and configured to:

define a first set of network policies and associate the first set of network policies with a first passphrase;

define a second set of network policies and associate the second set of network policies with a second passphrase, the second passphrase being different from the first passphrase;

determine a provided passphrase used by a client device while engaging in an authentication process to secure a network connection between the client device and the wireless network, and further determine if the provided passphrase matches one of the first passphrase and the second passphrase; and configure a traffic kernel module to provide the network connection to the client device, the network connection defined at least in part by the first set of network policies if the provided passphrase is the first passphrase and defined at least in part by the second set of network policies if the provided passphrase is the second passphrase;

wherein the first set of network policies and the second set of network policies each comprise at least one network policy;

wherein each network policy describes a network functionality to be provisioned through the network connection;

wherein the first set of network policies differs from the second set of network policies by at least a unique network policy that is found exclusively in one of the first set of network policies and the second set of network policies.

2. The mutable network device of claim 1, wherein the memory of the mutable network device comprises the traffic kernel module.

3. The mutable network device of claim 1, further comprising:

a wireless network interface communicatively coupled to the wireless network and the processor;

wherein the processor is further configured to:

broadcast a Service Set Identifier (SSID) for the wireless network through the wireless network interface; and receive a connection request from the client device through the wireless network interface, the connection request directed to the SSID.

4. The mutable network device of claim 1, wherein the wireless network is provided solely by a wireless network interface communicatively coupled to the processor of the mutable network device.

5. The mutable network device of claim 1, wherein the unique network policy comprises a schedule and a network functionality that is provisioned according to a schedule.

6. The mutable network device of claim 1, wherein the unique network policy enacts a filter to the network connection.

7. The mutable network device of claim 1, wherein the unique network policy comprises a network functionality conditioned upon an action of a user associated with the client device.

8. The mutable network device of claim 1, wherein the unique network policy comprises a network functionality that is limited.

9. The mutable network device of claim 1, wherein the unique network policy provisions the network connection subject to a population limit.

10. The mutable network device of claim 1, wherein the unique network policy defines when the client device will be redirected to a captive portal.

11. The mutable network device of claim 10, wherein the captive portal comprises a user interface through which a schedule exception can be requested.

12. A method for modifying functionality within a wireless network based on a provided passphrase, comprising:

defining a first set of network policies associated with a first passphrase for the wireless network;

defining a second set of network policies associated with a second passphrase for the wireless network, the second passphrase being different from the first passphrase;

determining if the provided passphrase used by a client device while engaging in an authentication process to secure a network connection with the wireless network matches one of the first passphrase and the second passphrase; and configuring a traffic kernel module to provide the network connection to the client device, the network connection defined at least in part by the first set of network policies if the provided passphrase is the first passphrase and defined at least in part by the second set of network policies if the provided passphrase is the second passphrase;

wherein the first set of network policies and the second set of network policies each comprise at least one network policy;

wherein each network policy describes a network functionality to be applied to the network connection;

wherein the first set of network policies differs from the second set of network policies by at least a unique network policy that is found exclusively in one of the first set of network policies and the second set of network policies.

13. The method of claim 12, wherein the unique network policy comprises a schedule and a network functionality that is applied according to a schedule.

14. The method of claim 12, wherein the unique network policy enacts a filter to the network connection.

15. The method of claim 12, wherein the unique network policy comprises a network functionality conditioned upon an action of a user associated with the client device.

16. The method of claim 12, wherein the unique network policy comprises a network functionality that is limited.

17. The method of claim 12, wherein the unique network policy applies a population limit on the network connection.

18. The method of claim 12, wherein the unique network policy defines when the client device will be redirected to a captive portal.

19. The method of claim 18, wherein the captive portal comprises a user interface through which a schedule exception can be requested.

20. A method for modifying functionality within a wireless network based on a provided passphrase, comprising:

defining a first set of network policies associated with a first passphrase for the wireless network;

defining a second set of network policies associated with a second passphrase for the wireless network, the second passphrase being different from the first passphrase;

determining if the provided passphrase used by a client device while engaging in an authentication process to secure a network connection with the wireless network matches one of the first passphrase and the second passphrase; and providing the network connection to the client device, the network connection defined at least in part by the first set of network policies if the provided passphrase is the first passphrase and defined at least in part by the second set of network policies if the provided passphrase is the second passphrase;

wherein the first set of network policies and the second set of network policies each comprise at least one network policy;

wherein each network policy describes a network functionality to be applied to the network connection; and wherein the first set of network policies differs from the second set of network policies by at least a unique network policy that is found exclusively in one of the first set of network policies and the second set of network policies.

* * * * *